(12) United States Patent
Hurd

(10) Patent No.: US 10,362,721 B2
(45) Date of Patent: *Jul. 30, 2019

(54) TILLAGE DEVICE FOR AGRICULTURAL MACHINERY OR IMPLEMENTS TO REDUCE COMPACTION CAUSED BY WHEELS IN A FIELD

(71) Applicant: Colin Josh Hurd, Ames, IA (US)

(72) Inventor: Colin Josh Hurd, Ames, IA (US)

(73) Assignee: AGRICULTURE CONCEPTS, LLC, Ames, IA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/651,079

(22) Filed: Jul. 17, 2017

(65) Prior Publication Data

US 2017/0311532 A1 Nov. 2, 2017

Related U.S. Application Data

(63) Continuation of application No. 14/950,900, filed on Nov. 24, 2015, now Pat. No. 9,736,974, which is a continuation-in-part of application No. 14/109,588, filed on Dec. 17, 2013, now Pat. No. 9,439,339.

(60) Provisional application No. 61/739,303, filed on Dec. 19, 2012.

(51) Int. Cl.
*A01B 37/00* (2006.01)
*A01B 35/16* (2006.01)
*A01B 49/02* (2006.01)

(52) U.S. Cl.
CPC ............. *A01B 37/00* (2013.01); *A01B 35/16* (2013.01); *A01B 49/02* (2013.01)

(58) Field of Classification Search
CPC ........... A01B 35/16; A01B 7/00; A01B 9/003; A01B 21/02; A01B 21/04; A01B 33/02–024; A01B 39/08; A01B 39/085; A01B 63/008; A01B 63/114; A01B 63/32; A01B 37/00
USPC ....... 172/122, 108, 109, 471, 468, 540, 548, 172/55, 134, 676
See application file for complete search history.

(56) References Cited

U.S. PATENT DOCUMENTS 1,332,643 A * 3/1920 Thomas ................. A01B 37/00
172/482
1,358,650 A * 11/1920 Pendleton .............. A01B 37/00
172/482

(Continued)

FOREIGN PATENT DOCUMENTS

DE 855011 C * 11/1952 ............. A01B 37/00

*Primary Examiner* — Matthew Troutman
(74) *Attorney, Agent, or Firm* — Christopher A. Proskey; BrownWinick Law Firm

(57) ABSTRACT

A system for tilling compression marks formed in a field by wheels of agricultural machinery the system including a first roller assembly having a plurality of blade assemblies positioned in spaced relation to one another. The first roller assembly rotatably connected to a swing arm which moves the first roller assembly between a disengaged position, where the roller assembly does not penetrate the soil, and an engaged position where the roller assembly does penetrate and till the soil. The first roller assembly is positioned behind and in alignment with a first wheel of the agricultural machinery such that the first roller assembly tills the compression mark formed by the first wheel.

24 Claims, 24 Drawing Sheets

(56) References Cited

U.S. PATENT DOCUMENTS

| | | | | |
|---|---|---|---|---|
| 1,422,967 A * | 7/1922 | Griswold | ............... | A01B 37/00 172/134 |
| 1,886,438 A * | 11/1932 | Weeks | ................... | A01B 37/00 172/468 |
| 2,319,899 A * | 5/1943 | Silver | ................... | A01B 13/16 172/134 |
| 3,193,021 A * | 7/1965 | Lane | .................... | A01B 33/021 172/316 |
| 4,195,696 A * | 4/1980 | Lundin | ................. | A01B 37/00 172/451 |
| 4,210,210 A * | 7/1980 | Ankenman | ............ | A01B 35/22 172/272 |
| 4,228,861 A * | 10/1980 | Hart | ....................... | A01B 37/00 172/445 |
| 4,237,985 A * | 12/1980 | Hoefkes | ................ | A01B 37/00 172/460 |
| 4,308,921 A * | 1/1982 | Davis | .................... | A01B 37/00 172/488 |
| 4,611,668 A * | 9/1986 | Hrubes | ................. | A01B 13/16 172/134 |
| 7,753,133 B2 * | 7/2010 | Skolness | ............... | A01B 39/08 172/551 |
| 7,814,984 B1 * | 10/2010 | Fraley | ................... | A01B 33/08 172/107 |
| 8,297,372 B2 * | 10/2012 | Buckrell | ............. | A01B 45/026 172/21 |
| 2004/0149467 A1 * | 8/2004 | Gilmer, Jr. | ............ | A01B 35/16 172/542 |
| 2007/0175644 A1 * | 8/2007 | Skolness | ............... | A01B 35/16 172/540 |

* cited by examiner

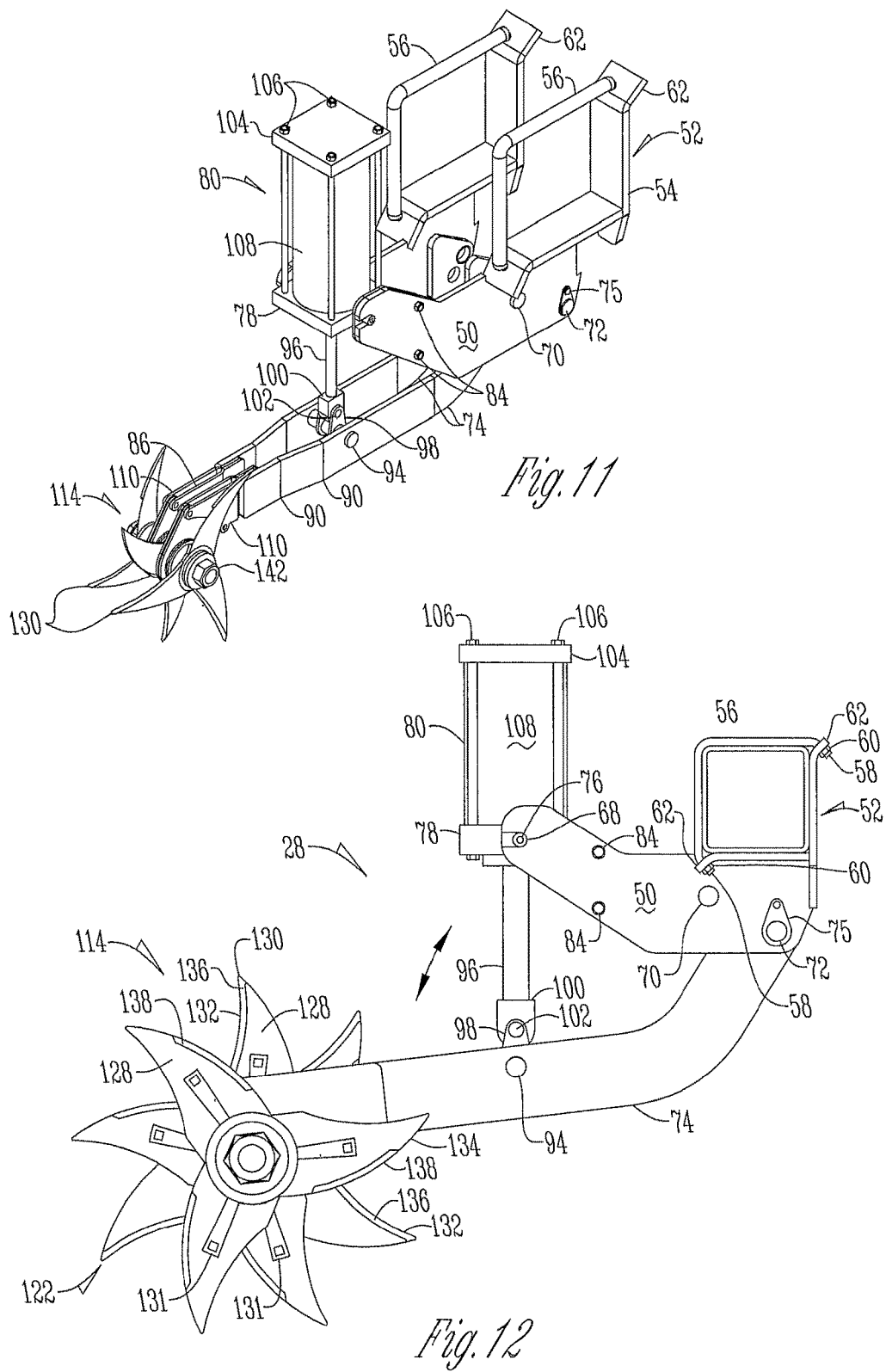

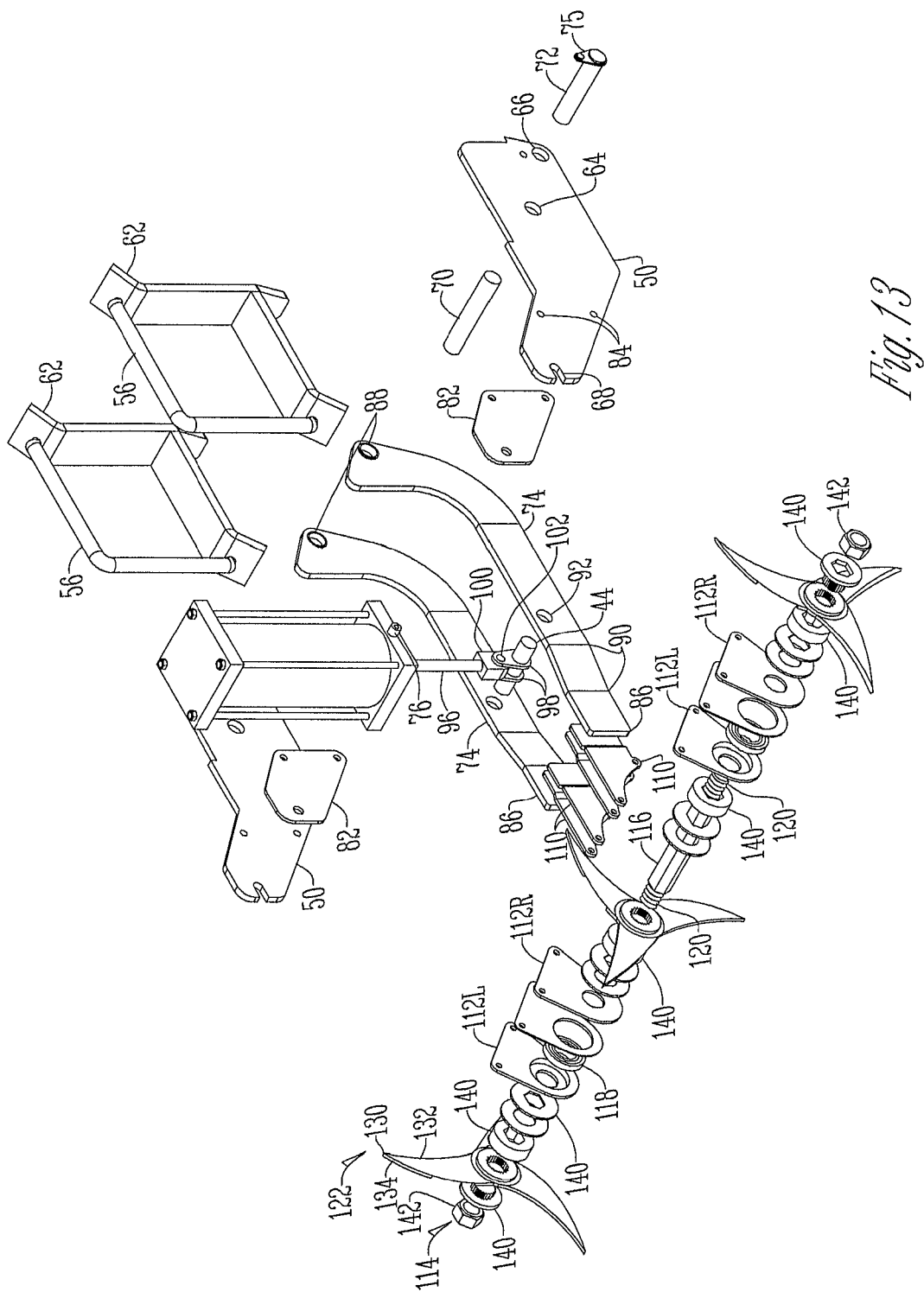

TILLAGE DEVICE FOR AGRICULTURAL MACHINERY OR IMPLEMENTS TO REDUCE COMPACTION CAUSED BY WHEELS IN A FIELD

CROSS REFERENCE TO RELATED APPLICATIONS

This application is a continuation of U.S. Utility application Ser. No. 14/950,900 which was filed on Nov. 24, 2015, which is a continuation-in-part of U.S. Utility application Ser. No. 14/109,588 filed Dec. 17, 2013, now U.S. Pat. No. 9,439,339 issued Sep. 13, 2016, which claims the benefit of U.S. Provisional Application No. 61/739,303 filed Dec. 19, 2012.

FIELD OF THE INVENTION

This invention relates to agricultural machinery and implements. More specifically, and without limitation, this invention relates to a tillage device for agricultural machinery and implements that reduces the compaction in a field caused by wheels which support the agricultural machinery or implement.

BACKGROUND

Improvements in machinery and technology have drastically changed agricultural practices. As machinery and technology has improved, this has allowed farmers to grow the size of their operations. As the number of acres a farmer must plant, fertilize, spray and harvest increases, so must grow the size and capacity of the farmer's agricultural implements. The term "agricultural implement" and/or "agricultural machinery" used herein generically describes any farming device such as a planters, tractors, sprayers, cultivators, combines, harvesters, spreader, wagons, truck, or any other vehicle or implement or attachment to any of these devices of any kind that travels across farm ground and causes compaction.

While the improvements in technology, and the increased size of agricultural implements has allowed farmers to operate more and more land, the increasing size of agricultural implements has its disadvantages. Namely, as the size and capacity of agricultural implements increases, so does the weight of the agricultural implements. As the weight of the agricultural implement increases, so increases the amount of compaction caused by the wheels supporting the agricultural implement as it drives through the field. The more compacted the soil becomes, the less farmer's crops yield because compaction prevents plants roots from dispersing through the soil.

This phenomenon is especially apparent with planters. The size of planters has grown substantially over time, from only a couple of rows, to some as large as 48 rows. Not only has the size of the planters substantially increased, but the seed carrying capacity has also substantially increased. While this arrangement allows a farmer to plant a huge amount of land in an extremely efficient manner, the increased weight of the planter plus the large amount of seed it is carrying, causes severe compaction in the field. This compaction comes at an extremely vulnerable time for the crop as the seed has just been planted and must quickly germinate, root, and penetrate the soil otherwise it will perish.

Solutions to this problem have been elusive. A common solution for compaction has traditionally been to till or rip the compacted ground. However, deep tillage or ripping of the soil has traditionally required a tremendous amount of horsepower and/or torque. With the use of modern planters that are large and heavy, the pulling tractor is already taxed to the point where adding features that cause large amounts of additional drag on the planters is extremely undesirable. Furthermore, because in the case of a planter, the seed has just been planted, care must be taken to reduce compaction while not disturbing the placement of the seed, which many forms of traditional tillage may do.

Another solution to the problem of compaction has been to add additional wheels to the agricultural implement to disperse the compaction over a greater area. While adding more wheels resolves some of the compaction, it is extremely expensive and complicated to add additional weight bearing wheels to already complex equipment. In addition, adding wheels causes additional compaction in other areas. As such, the addition of more wheels is no solution at all and in-fact can cause further problems, and can reduce the farmer's yield more than the conventional arrangement where the ground under the implement's wheels is essentially sacrificed.

Another attempted solution to the problem of compaction has been to add tracks to the implement. While tracks effectively spread the weight of the tractor and planter over more area, which reduces compaction it comes at the cost of maneuverability. In addition, transporting machinery with tracks versus wheels, travel speed need to be reduced to avoid excessive vibration and extensive wear. Tracks also have a tendency to greatly disturb and damage the field when the implement is turned at the end rows of the field because the tracks tear or berm the soil. As such, what is often gained from a compaction standpoint is often lost in maneuverability and damage to the field standpoint.

Therefore, for the reasons stated above, and for other reasons stated below, which will become apparent to those skilled in the art upon reading and understanding the specification, and the drawings, there is a need in the art for a tillage device for agricultural machinery or implements to reduce compaction.

Thus, it is a primary object of the invention to provide a tillage device for agricultural machinery or implements that reduces compaction caused by wheels in a field.

Another object of the invention to provide a tillage device for agricultural machinery or implements that reduces compaction that is easy to use.

Yet another object of the invention to provide a tillage device for agricultural machinery or implements that reduces compaction that is can easily be installed on conventional and existing agricultural implements.

Another object of the invention to provide a tillage device for agricultural machinery or implements that reduces compaction that does not substantially interfere with the use or operation of the agricultural machinery or implements.

Yet another object of the invention to provide a tillage device for agricultural machinery or implements that reduces compaction that is robust.

Another object of the invention to provide a tillage device for agricultural machinery or implements that reduces compaction that is simple.

Yet another object of the invention to provide a tillage device for agricultural machinery or implements that reduces compaction that does not greatly increase the amount of drag placed on the agricultural implement or greatly increase the amount of torque or horsepower required to operate the agricultural implement.

Another object of the invention to provide a tillage device for agricultural machinery or implements that reduces compaction that has a simple and intuitive design.

Yet another object of the invention to provide a tillage device for agricultural machinery or implements that reduces compaction that is relatively inexpensive.

Another object of the invention to provide a tillage device for agricultural machinery or implements that reduces compaction that improves plant yield and health.

Yet another object of the invention to provide a tillage device for agricultural machinery or implements that reduces compaction that has a long useful life.

Another object of the invention to provide a tillage device for agricultural machinery or implements that reduces compaction that has a short pay-back period.

Yet another object of the invention to provide a tillage device for agricultural machinery or implements that reduces compaction that has a minimum number of parts.

Another object of the invention to provide a tillage device for agricultural machinery or implements that reduces compaction that can be precisely controlled.

Yet another object of the invention to provide a tillage device for agricultural machinery or implements that reduces compaction that is that is selectively positional between an operable position and an inoperable position.

Another object of the invention to provide a tillage device for agricultural machinery or implements that reduces compaction that reduces or eliminates the effect of implement weight has on compaction.

Yet another object of the invention to provide a tillage device for agricultural machinery or implements that reduces compaction that is a one-pass solution.

These and other objects, features, or advantages of the invention will become apparent from the specification, drawings and claims.

BRIEF SUMMARY OF THE INVENTION

The invention is directed to a tillage system positioned behind the weight-carrying wheels of an agricultural implement or machine. The drawings depict a design for use on a planter as one example, and only an example. While the invention is described for use on planters, it is also applicable, and hereby contemplated to be used in association with any agricultural implement or machine, which travels across a farm field and thereby causes compaction of the soil. These implements and machines may include the following; planters, cultivators, fertilizer applicators, sprayers, liquid manure tanks, row cultivators, harvesters, pull behind tanks, tractors, disks, harrows, aerators, chisels, or rippers.

The invention, in this particular form, consists of a moving linkage that allows the tillage device to raise and lower into and out of the soil, a tilling mechanism that effectively fractures and decompresses the compacted layers of soil, and a method of attachment to machine or implement, and the ability to be disengaged the system from use independent of the implement or machine it is attached to.

BRIEF DESCRIPTION OF THE DRAWINGS

FIG. 11 is a perspective view of a third embodiment of a tillage device for an agricultural implement.

FIG. 12 is a side elevation view of the third embodiment shown in FIG. 11.

FIG. 13 is an exploded perspective view of the third embodiment shown in FIGS. 11 and 12.

DETAILED DESCRIPTION

Figure 1:
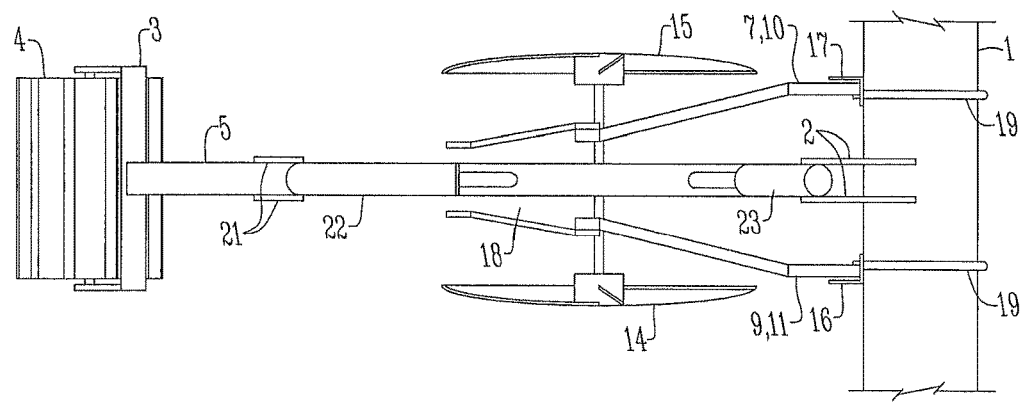
FIG. 1 is a top elevation view of a first embodiment of a tillage device for an agricultural implement having a pair of vertical tines with a rolling basket.
Figure 2:
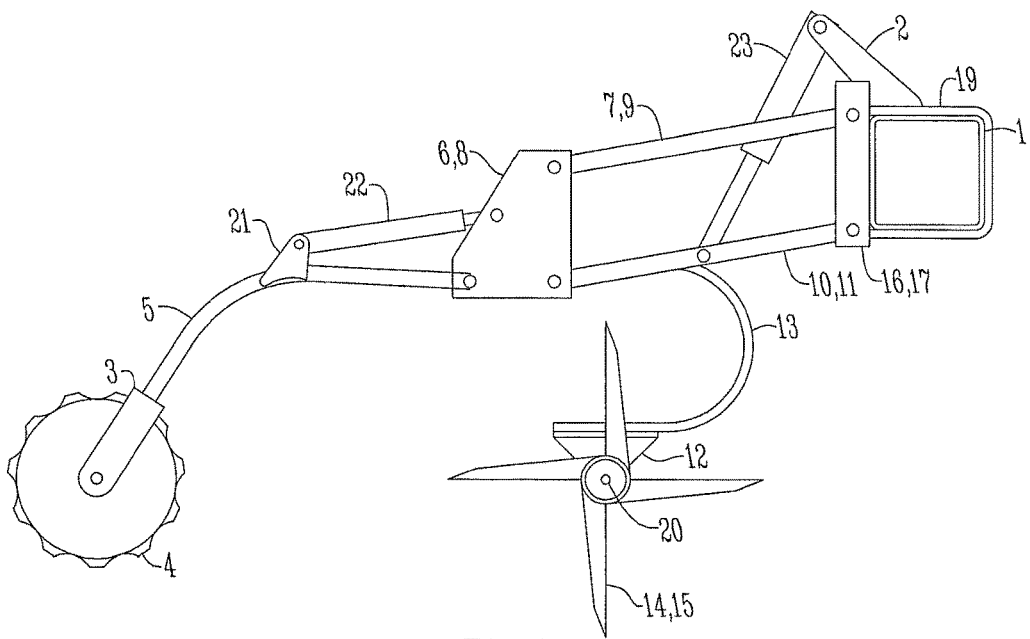
FIG. 2 is a side elevation view of the first embodiment shown in FIG. 1.
Figure 3:
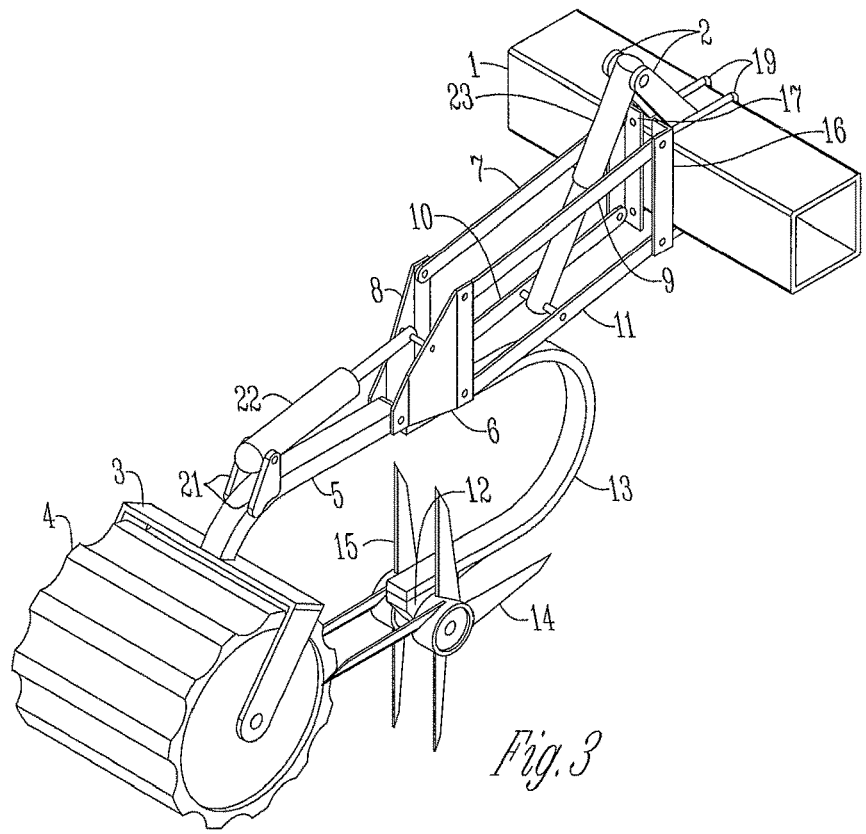
FIG. 3 is a perspective view of the first embodiment shown in FIGS. 1 and 2.
Figure 4:
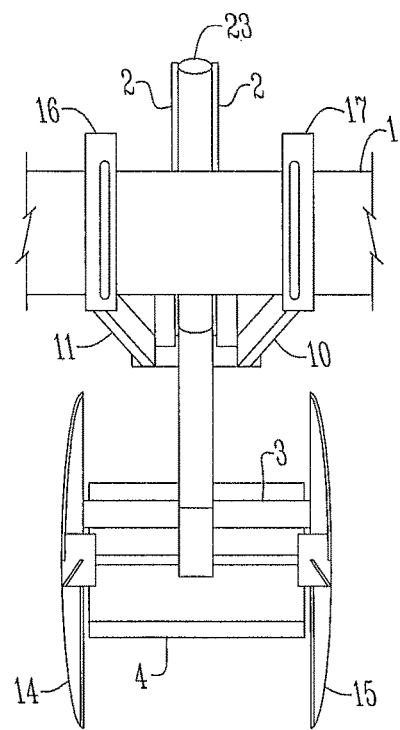
FIG. 4 is a front elevation view of the first embodiment shown in FIGS. 1-3.
Figure 5:
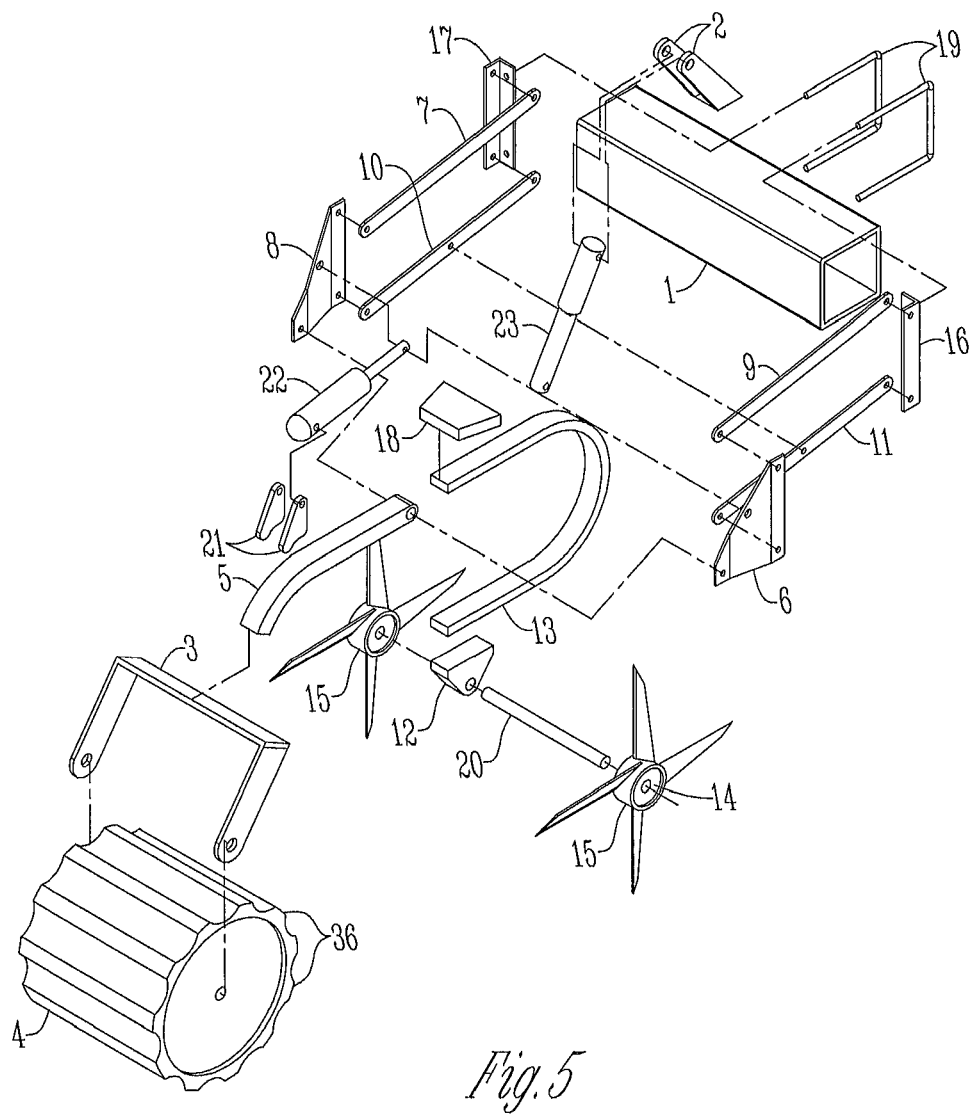
FIG. 5 is an exploded perspective view of the embodiment shown in FIGS. 1-4.
Figure 6:
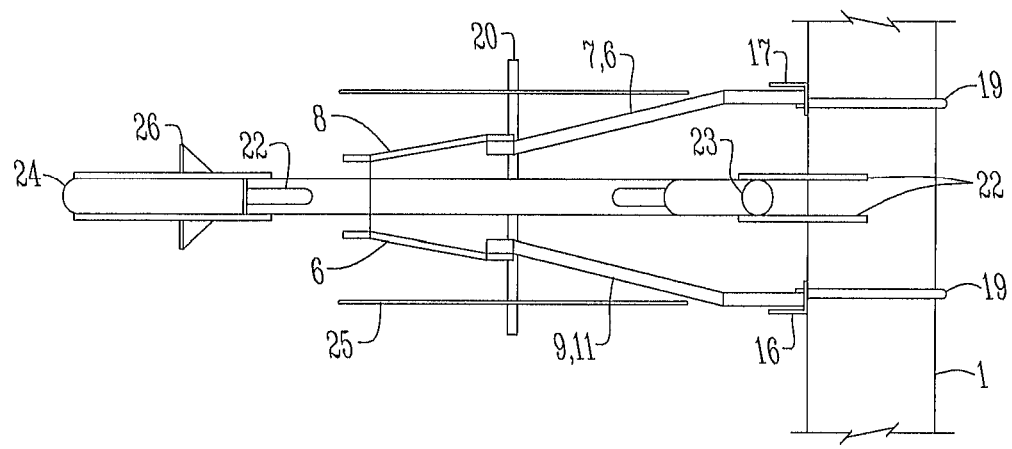
FIG. 6 is a front elevation view of a second embodiment of a tillage device for an agricultural implement having tillage shank and a pair of coulters.
Figure 7:
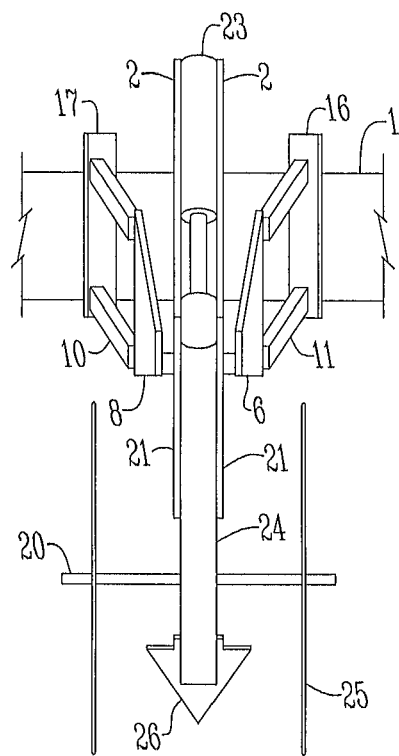
FIG. 7 is a rear elevation view of the second embodiment shown in FIG. 6.
Figure 8:
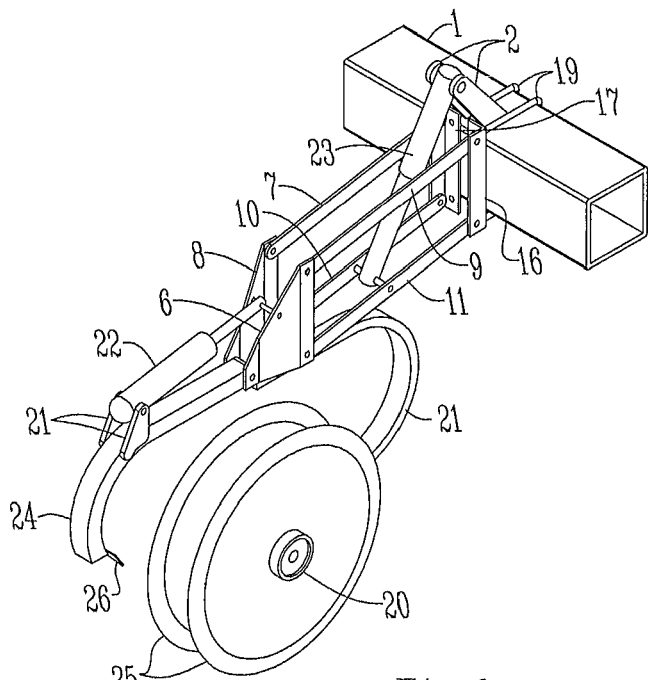
FIG. 8 is a perspective view of the second embodiment shown in FIGS. 6 and 7.
Figure 9:
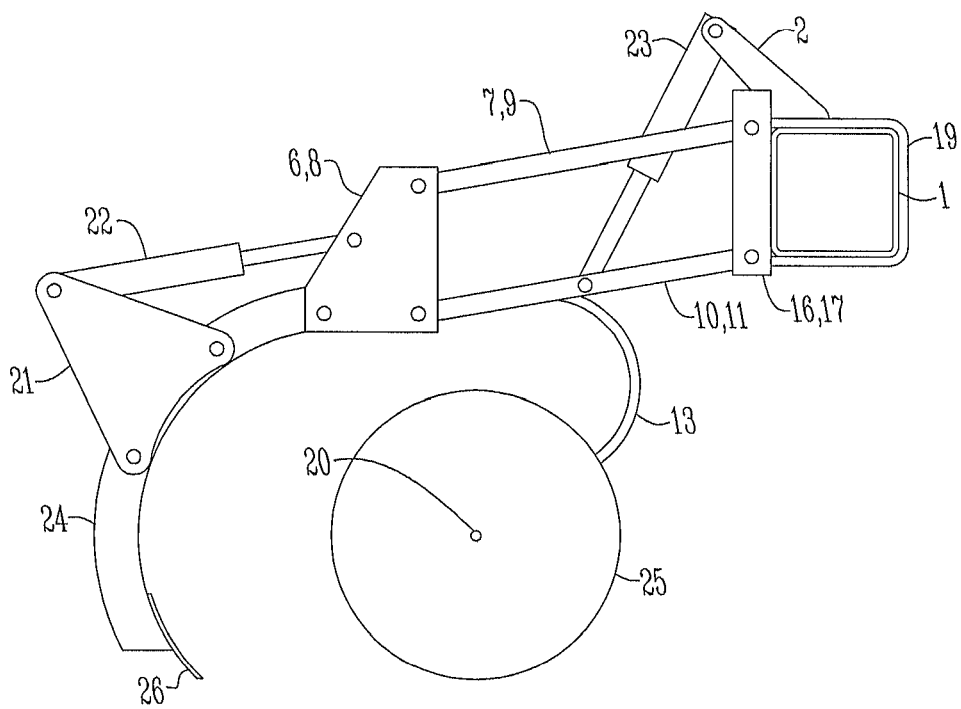
FIG. 9 is a side elevation view of the second embodiment shown in FIGS. 6-8
Figure 10:
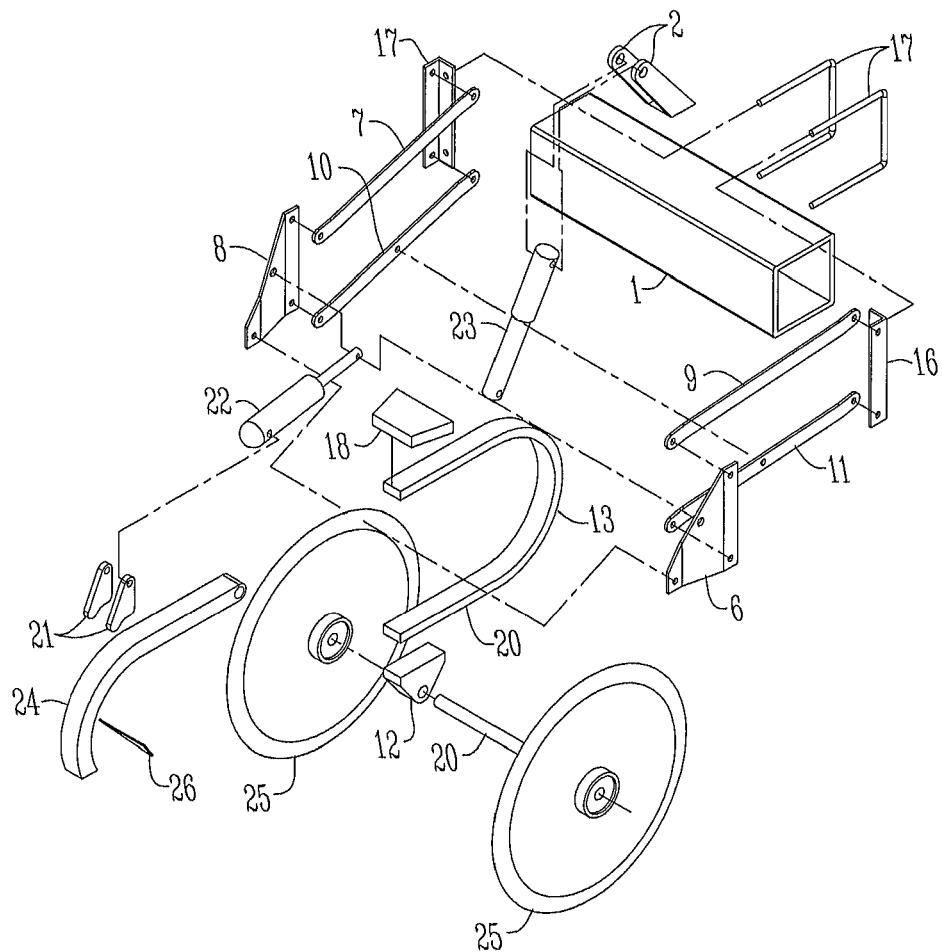
FIG. 10 is an exploded perspective view of the second embodiment shown in FIGS. 6-9.
Figure 14:
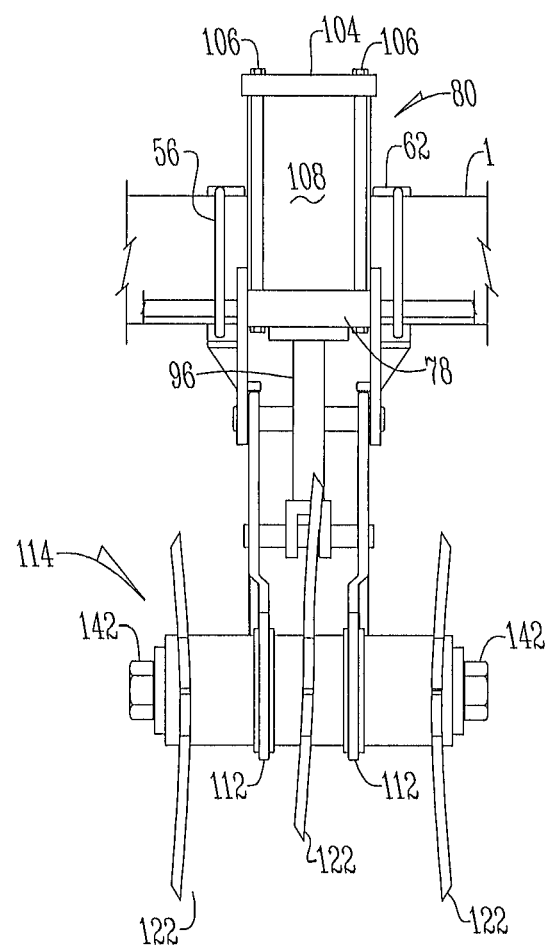
FIG. 14 is a rear elevation view of the third embodiment shown in FIGS. 11-13.

In the following detailed description, reference is made to the accompanying drawings which form a part hereof, and in which is shown by way of illustration specific embodiments in which the invention may be practiced. These embodiments are described in sufficient detail to enable those skilled in the art to practice the invention, and it is to be understood that other embodiments may be utilized and that mechanical, procedural, and other changes may be made without departing from the spirit and scope of the present inventions. The following detailed description is, therefore, not to be taken in a limiting sense, and the scope of the present invention is defined only by the appended claims, along with the full scope of equivalents to which such claims are entitled.

As used herein, the terminology such as vertical, horizontal, top, bottom, front, back, end and sides are referenced according to the views presented. It should be understood, however, that the terms are used only for purposes of description, and are not intended to be used as limitations. Accordingly, orientation of an object or a combination of objects may change without departing from the scope of the invention.

First Embodiment

In FIGS. 1-5, show a tillage device 28 bolted to the frame 1 of an agricultural implement 30. The tillage device 28 includes four linkage arms 7, 9, 10, 11 attach to the left and right angle iron 16, 17 with pins to allow vertical movement of the linkage arms 7, 9, 10, 11. The angle iron 16, 17 is mounted to the frame 1 of the agricultural implement 30 with U-bolts 19. A hydraulic cylinder 23 extends between the linkage arms 7, 9, 10, 11 and serves to raise and lower the linkage arms 7, 9, 10, 11 when actuated. The hydraulic cylinder 23 connects at its upper end to a pair of mounting plates, 2 fitted to the frame 1. The hydraulic cylinder 23 connects to the inside of the lower linkage arms 7, 9 adjacent its lower end. The linkage arms 7, 9, 10, 11 extend from the angle iron 16, 17 at their upper ends to the two rear mounting plates 6, 8 at their lower ends.

Between these two rear mounting plates 6, 8, the C-spring mount 18 is secured and attached to the C-spring 13, adjacent its upper end. A bearing holder 12 is fastened to the C-spring 13, and a spike shaft 20 is rotatably fitted within the bearing holder 12 and one or more rolling aeration spikes 14,15 are mounted in parallel spaced relation to the spike shaft 20 either in a rotatable or non-rotatable fashion. Also connected to the rear mounting plates 6, 8 is the basket mounting arm 5 and a spring loaded tension rod 22. The tension rod 22 is attached at its lower rearward end to the mounting arm 5 by a bracket 21. The mounting arm 5 attaches at its lower rearward end to the rolling basket leveler 4 by the wheel-mounting bracket 3.

Second Embodiment

FIGS. 6-10 depict a second embodiment, of a tillage device 28 which is similarly mounted to the frame 1 of an agricultural implement 30 as is shown in FIGS. 1-5 and includes many of the same components and arrangement of parts as is shown and described with respect to the first embodiment. In this arrangement, the rolling aeration spikes 14, 15 are replaced with coulters 25, which are formed in the shape of disks instead of having a plurality of spikes or tines. This embodiment also includes a shank 24 which points forward toward frame 1 and includes a removable shovel or point 26 attached to the lower end of the shank 24. The upper end of shank 24 is connected to the rear mounting plates 6, 8. FIGS. 6-10 also depict a spring-loaded tension rod 22 which connects to the rear plates 6, 8 and the spring mount 21 on the shank 24.

In this proposed embodiment, bolting the tillage device 28 to the frame 1 of an agricultural implement 30 will secure the tillage device 28 to the agricultural implement 30, such as a planter, and allow the tillage device 28 to reside directly behind the wheels 32 of the agricultural implement 30 where the compaction exists. The hydraulic lift cylinder 23 will raise and lower the tillage device 28 into and out of the soil. In doing so, the linkage arms 7, 9, 10, 11 will rotate upon pins that allow rotation and therefore vertical movement at the connecting points. At the rear of the linkage arms 7, 9, 10, 11, the rear mounting plates 6, 8 shall tie the c-spring 13 and rolling basket 4 through the basket mount 5. The c-spring 13 will serve as the mount for the bearing coupling hub 12 which holds the shaft 20 of the rolling vertical tines 14, 15 or coulters 25. As the agricultural implement 30 is pulled by the tractor 34 through the field, the tines 14, 15 or coulters 25 shall enter the soil in a slicing fashion that will break and lift the compacted soil directly behind the wheels 32 of either the agricultural implement 30 or the tractor 34 thus reducing compaction's effect. The rolling basket leveler 4 consists of horizontal rods or ridges 36 that span between each side. It will serve the purpose of breaking any possible clods in the soil by rolling forward behind the tines 14, 15 to press and level the soil. The rolling basket 4 is attached to the tillage device 28 by basket mount arm 5 that can be forced into the soil with varying downwards pressure by adjusting the tension of the spring loaded tension rod 22.

To make this particular embodiment of the invention one ordinarily skilled the art must take the following steps. The first step is to obtain the necessary materials, since the making of the product consist primarily of assembling the different components. The following components may be necessary depending on the application for the invention, implement type, and the desired results; a primary tillage mechanism (vertical tines 14, 15, shank 24 and point 26, coulters 25 or other), hydraulic cylinder 23, rolling basket 4 (optional), C-spring 13 and a spring-loaded tension rod 22. The next step is to fabricate the parallel linkages 7, 9, 10, 11, which includes forward 2 and rear mounting plates 6, 8 on each, an arm 5 for attaching the rolling basket 4 and the bracket 21 to attach the tension rod 22. Once the previous is completed, holes must be made so bolts and pins can fasten the components together in the following manner. First, assemble the arms of the linkage 7, 9, 10, 11 to the angle iron 16, 17 in front and mounting plates 6, 8 in the rear. Then attach the hydraulic cylinder 23 to the front mounting plates 2 and the linkage arms 7, 9, 10, 11. Next, attach the C-spring 13 to the base of the rear connecting plates 6, 8. Then fix either the coulters 25 or the vertical tillage tines 14, 15 to the spike shaft 20 connected to the bearing holder 12 connected to the C-spring 13. Next, assemble the arm 5 for the rolling basket 4 by attaching the bracket 21 and tension rod 22. Once completed attach the rolling basket 4 to the aforementioned arm 5 and mount on the rear connecting plates 6, 8 attached to the linkage arms 7, 9, 10, 11. Alternatively, a shank 14, 15 or other primary tillage system could be attached to the rear mounting plates 6, 8 of the linkage arms 7, 9, 10, 11 and fitted with a tension rod 22. Once all of the previous steps are taken, the entire assembly can be bolted to the frame 1 of the agricultural implement 30 and the hydraulic cylinder 23 can be connected to active lines.

Although the preceding description contains significant detail it should not be construed as limiting the scope or application of the invention but rather as providing illustrations and descriptions of possible embodiments of the invention. These elements could take drastically different form from the design currently proposed and still accomplish the purpose of this invention, to till soil compacted by the wheels of machinery and implements. All of the proposed methods for tilling the soil are not limiting and could be substituted for any other device or system that tills the soil effectively. Any other mounting design, which connects a tilling device 28 in a position to till the wheel compacted soil from the agricultural implement 30 could be used. The tillage device may be modified to include its own source of power or rotation, such as a motor or engine and therefore may till the soil with power of its own, or alternatively the tillage device may be passive and rotate under power from the pulling force of whatever it is attached to. The leveling system could be left out entirely or drastically changed and the invention could still serve its purpose. The lifting capability may take many different forms or be left out entirely. Once again, the entire design and application may be drastically modified from the currently proposed design and application to fit different types and makes of implements without inhibiting the functionality or purpose of the invention to till soil compacted by an implement's or machine's wheels.

In the proposed design, the parallel linkage provides the ability to raise or lower the device, however this functionality can be accomplished through many other forms. From the linkage a number of different designs to till the soil could be used for example, shanks, coulters or an independently powered tilling device. In place of the currently proposed rolling basket leveling system, other approaches could be taken to accomplish the same results, such as drag chains or harrow spikes. The entire tilling system could be arranged in any fashion so long as it tills the compacted soil. Additionally, instead of a hydraulic lifting system a different system may be used, such as a folding linkage attached to the implement's lifting system or an air bag system. It could also be possible to mount the invention ridged on an implement, this would only allow it to move into and out of the soil with the implement, it is attached to.

To use this embodiment of the invention after the assembly is made it must be mounted to an implement or machine. To achieve the purpose of the invention it will need to be located in a position that allows it to till the soil compacted from the wheels of the implement or machine. The hydraulic cylinder 23 allows the tillage spikes 14, 15, or coulters 25 to be raised out of the soil, and lowered into the soil. Once installed, the device can be engaged while traveling through the field by lowering it with hydraulics into the soil at a depth suitable to the soil conditions and type, normally so it tills soil 8-10 inches deep. In most applications, it will achieve its purpose while the machine or implement is engaged. For example, when using it on row-crop planters it will till the soil during the planting process. Furthermore, the implement it is attached to must be in forward motion to allow the device to have an impact and till the soil. Thus, in most cases the compaction will be alleviated by the tillage device during the same pass where it is created by the implement or machine traveling through the field.

Third Embodiment

An alternative third embodiment is presented with reference to FIGS. 11-15. This third embodiment is often used when it is required to position the tillage device 28 between row units of a planter. In this third embodiment, the tillage device 28 includes a pair of mounting plates 50 that are positioned in generally parallel spaced relation to one another. Mounting plates 50 are generally flat and planar in shape and include a number of openings and features as are described herein. Frame mounting members 52 are connected to the upper forward edge of mounting plates 52 and serve to connect to and hold the tube frame 1 of the agricultural implement 30.

Frame mounting members 52 include a generally L-shaped lower portion 54. The L-shaped lower portion 54 is connected to the mounting plates 50 by any means such as welding, screwing, bolting or forming the two components out of a single piece of material. The L-shaped lower portion 54 defines two sides of the square of the tube frame 1. Removably connected to the L-shaped lower portion 54 are one or more straps 56. In the arrangement shown, straps 56 are tubular shaped rods, similar to U-bolts 19 described herein, except straps 56 cover approximately two sides of the tube frame 1, and only include a single 90 degree bend therein. The ends 58 of straps 56 are in one arrangement threaded and angle slightly toward one another and receive conventional nuts 60. These threaded ends 58 extend approximately perpendicularly through angled tabs 62 of the L-shaped lower portion 54 so as to ease installation.

To install the tillage device 28 on tube frame 1 of agricultural implement 30, the L-shaped lower portion 54 is positioned on the lower and forward sides of the tube frame 1 and the straps 56 are positioned on the upper and rearward sides of the tube frame 1, the ends 58 are inserted through he angled tabs 62 and the nuts 60 are tightened over the threaded ends 58 thereby securely but removably installing the tillage device 28 on the agricultural implement.

Mounting plates 50 extend rearward from frame mounting members 52 and include a first opening 64, a second opening 66 and a third opening 68. The first opening 64 receives first shaft 70 which extends between opposing mounting plates 50 thereby connecting them together providing appropriate spacing and rigidity. In one arrangement, first shaft 70 is rigidly mounted to mounting plates 50 and therefore does not allow relative movement there between, whereas in an alternative arrangement, the first shaft 70 is non-rigidly mounted and therefore allows rotation and relative movement.

Second opening 66 receives second shaft 72 which extends between opposing mounting plates 50 thereby connecting them together providing appropriate spacing and rigidity. In one arrangement, second shaft 72 is rigidly mounted to mounting plates 50 and therefore does not allow relative movement there between, whereas in an alternative arrangement, the first shaft 72 is non-rigidly mounted and therefore allows rotation and relative movement. Second shaft 72 also extends through the upper forward end of swing arms 74. In one arrangement, swing arms 74 rotate or pivot upon second shaft 72. Also, in one arrangement, first shaft 70 between opposing mounting plates 50 provides a stop for the rotation of swing arms 74. That is, when swing arms 74 rotate fully downward, the upper rearward end of swing arms 74 engage the first shaft 70 thereby providing a rotational stop. In one arrangement, as is shown, a collar 75 is connected to the ends of second shaft 72 and serves to mount and hold second shaft 72 in place within second opening 64.

Third opening 68 receives second shaft 76 which extends between opposing mounting plates 50 thereby connecting them together providing appropriate spacing and rigidity. In one arrangement, as is shown, third shaft 76 is connected to the base plate 78 of hydraulic cylinder 80. While cylinder 80 is herein described as a hydraulic cylinder, it is hereby contemplated that any form of a device which converts pressure or power to movement is hereby contemplated for use such as a hydraulic cylinder, a pneumatic cylinder, an air bag, a solenoid or any other device. In one arrangement, these devices are broadly referred to as a movement device. Also positioned adjacent the inward side of third opening 68 is a cylinder mounting plate 82 which is connected to mounting plate by any means such as bolting, welding or the like. In the arrangement shown, cylinder mounting plate 82 is connected to mounting plate 50 by conventional fasteners 84, such as bolts or screws. In the arrangement shown, cylinder mounting plate includes third opening, whereas the mounting plate 50 includes a notch in that forms third opening 68. This combination of a notch in the mounting plate 50 and an opening in the cylinder mounting plate 82 allows the third shaft 76 to be connected to and held by the cylinder mounting plate 82 while allowing for support to be provided by the mounting plate 50 while simultaneously allowing for cylinder 80 to pivot during operation. In the arrangement shown, the portion of mounting plates 50 that include third opening 68 are positioned above and rearward from the other portions of mounting plate 50, so as to place cylinder 80 the appropriate position for controlling swing arms 74.

Swing arms 74 are generally elongated, planar, and L-shaped. Swing arms 74 are positioned in approximate parallel spaced alignment to one another and extend from an upper forward end to a lower rearward end 86. Forward end includes an opening 88 which receives second shaft 72. Opening 88, in one arrangement is matched within close tolerances to the diameter of second shaft 72 so as to provide a close fit while allowing for smooth rotation thereon. In one arrangement, a collar or tube extends through or between opposing opening 88 so as to increase the surface area of contact between swing arms 74 and second shaft 72 adjacent second opening 66.

While swing arms 74 are generally positioned in generally parallel spaced relation to one another, swing arms 74 neck inward or narrow toward one at fold lines 90 at or near rearward end 86. In the arrangement shown, this neck inward is accomplished by a simple bend in the swing arms 74 before the rearward ends 86 resume their parallel alignment and extension adjacent rearward ends 86. An opening 92 is positioned between rearward end 86 and the forward end of swing arms 74.

Opening 92 receives a fourth shaft 94. Fourth shaft 94 serves to connect the lower rearward ends of opposing swing arms 74 and thereby provides appropriate spacing and rigidity thereto. In addition, fourth shaft 94 serves as a mounting point and pivot point for push rod 96 of cylinder 80. To facilitate this connection, fourth shaft 94 includes a pair of struts 98 which extend outwardly from forth shaft 94 in approximate parallel spaced relation and include an opening adjacent their ends. In this arrangement, push rod 96 includes a head 100 with a head shaft 102 that extends outwardly therefrom and engages and connects to the openings in struts 98. In this arrangement, as the pushrod pushes or pulls, the torque causes the fourth shaft 94 to rotate and thereby causes the head shaft to rotate within the openings of struts 98 thereby allowing for appropriate angular adjustment. In an alternative arrangement, cylinder 80 and/or push rod 96 is connected to swing arms 74 or fourth shaft 94 by any other manner or method.

Cylinder 80 includes a base plate 78 positioned in approximate parallel space alignment to an opposing top plate 104 which are connected together by a plurality of support fasteners 106. Positioned within the support fasteners 106 and between the base plate 78 and top plate 104 is a cylinder mechanism 108. Push rod 96 extends outwardly through base plate 78 which is connected to third opening 68 of mounting plates 50 and cylinder mounting plates 82. As the push rod 96 extends and retracts the head shafts 102 rotate within the openings of struts 98 and fourth shaft 94 rotates while cylinder 80 tilts or rotates upon third shaft 76 which is held between opposing mounting plates 50 in third opening 68.

Yokes 110 are connected adjacent the rearward ends 86 of swing arms 74 and extend rearward therefrom. In the arrangement shown, one yoke 110 is positioned on either side of the rearward end 86 of swing arms 74 and extend in generally planar parallel spaced relation therefrom. Yokes 110 are connected to swing arms 74 by any manner or means such as welding, screwing, bolting or forming the components out of a single piece of material. The rearward end of yokes 110 include an arcuate or curved surface and an opening adjacent the upper end and lower end. These spaced openings are used to mount one or more arbor brackets 112 to yokes 110 using conventional fasteners such as screws or bolts, and the curved rearward end of yokes 110 provides clearance for the rotation of roller assembly 114. In the arrangement shown, the upper forward end of arbor bracket 112 is connected to yokes 110 and in this way yokes 110 provide rigidity and stability to arbor bracket 112. In this arrangement, arbor bracket is held in approximate alignment with the rearward end 86 of swing arm 74.

Arbor brackets 112 have a generally centrally positioned circular opening therein that receives arbor shaft 116 there through. A bearing 118 is connected to and/or positioned between arbor shaft 116 and arbor bracket 112. Bearing 118 is any form of a bearing such as a roller bearing, a race bearing, or the like and allows arbor shaft 116 to rotate within arbor bracket 112. In one arrangement bearing 118 is connected to a single arbor bracket 112, in an alternative arrangement bearing 118 is sandwiched between a pair of arbor bracket 112 thereby holding the bearing in place therebetween. Alternatively, bearing 118 is connected to arbor bracket 112 by any other manners or methods that allows secure attachment while allowing rotation of arbor shaft 116. In one arrangement, as is shown, bearings 118 are held within a pocket formed in arbor bracket 112. In this arrangement a left arbor bracket 112L, a center arbor bracket 112C and a right arbor bracket 112R are used. The left arbor bracket 112L has a pocket that receives the left side of bearing 118. The center arbor bracket 112C has an opening that fits around and that receives the center portion of bearing 118. The right arbor bracket 112R has a pocket that receives the right side of bearing 118. These three components 112L, 112C and 112R are positioned around and clamshell bearing 118 therebetween. These connected components 112L, 112C, and 112R with bearing 118 therein are then positioned between opposing yokes 110 thereby forming a rigid structural component that allows for rotation of roller assembly 114 therein. The spacing of a pair of these arbor brackets 112L, 112C and 112R, each connected between a pair of yokes 110 connected to swing arms, provides balance and stability to roller assembly 114.

In the arrangement shown, arbor shaft 116 extends a length between opposing threaded ends 120 and has a non-round portion positioned therebetween. In the arrangement shown, the non-round portion of arbor shaft 116 has a hexagonal shape that allows for mounting of other components thereon while preventing the rotation of these components on arbor shaft 116. While a hexagonal shape is shown, any other non-round shape is hereby contemplated for use.

One or more blade assemblies 122 are connected to and positioned around arbor shaft 116. In the arrangement shown, three blade assemblies 122 are connected to arbor shaft 116; one blade assembly 122 positioned adjacent each threaded end 120 of arbor shaft 116, and one blade assembly 122 positioned approximately centrally on arbor shaft 116 between the opposing swing arms 74 and between opposing pairs of yokes 110. However, any other number of blade assemblies 122 are hereby contemplated for use such as one, two, four, five, six, seven, eight, nine, ten or more.

In the arrangement shown, blade assemblies 122 include a central hub 124 which has a generally centrally positioned opening 126 that is sized and shaped to fit around arbor shaft 116. In the arrangement shown, the centrally positioned opening 126 has a ridged or knurled surface such that when it is positioned around the hexagonal arbor shaft 116 it does not rotate. It is hereby contemplated that the centrally positioned opening 126 has a matching shape, that is when arbor shaft 116 is hexagonal, centrally positioned opening 126 is similarly hexagonal in shape and fits over arbor shaft 116 within close tolerances or fitting frictional engagement.

A plurality of tines 128 are connected to central hub 124. Tines 128 are formed of any suitable size, shape and design. In the arrangement shown, three tines 128 are connected to central hub 124 and are equally spaced there around. That is, each tine is spaced approximately 102 degrees from the next tine 128 around the central axis of rotation of arbor shaft 116. Any other number of tines 128 are hereby contemplated for use such as one, two, four, five, six, seven, eight, nine, ten or more. Or alternatively, disks or coulters 25 of any design are hereby contemplated for use instead of tines 128. In one arrangement, as is shown, tines 128 are removable and replaceable. That is, tines 128, which can break or wear over time, can be removed and replaced on central hub 124, which is not likely to wear or break. This reduces the cost of ownership and allows for easy customization and/or replacement. Removable tines 128 are connected to central hub 124 by any manner or method such as conventional fasteners such as bolts or screws, or through fitting engagement such as interlocking features, like a dovetail joint or the like. In an alternative arrangement, blade assemblies 122 are formed of a single piece and must be wholly replaced.

Tines 128 extend from their base, which connects to central hub 124, to a point 130. In one arrangement, to improve the strength and rigidity and durability of tines 128, gussets 131 are formed in or connected to the sides of tines 128. Gussets 131 are formed of any suitable size, shape and design, and in the arrangement shown, gussets 131 are formed of an added piece of material that extends outwardly from the side of tines 128 adjacent the base of tines 128 and terminates before point 130. Tines 128 include a leading edge 132, which first engages the soil as the roller assembly 114 rotates, and a trailing edge 134, which last exits the soil as the roller assembly 114 rotates. Tines 128 can be formed of any suitable size, shape or design. In one arrangement, leading edge 132 and trailing edge 134 are straight so as to form a triangle at point 130. In an alternative arrangement, leading edge 132 and trailing edge 134 are arcuate or curved. In the arrangement shown in FIGS. 13 and 15, leading edge 132 is slightly concave in shape, whereas the trailing edge 134 is slightly convex in shape, which is the standard arrangement and has yielded positive results in testing. With that said, it is hereby contemplated to reverse this arrangement, as is shown in FIGS. 11 and 12, which may have benefits over the standard arrangement in certain applications. It is hereby contemplated to place a beveled portion in one or both of the leading edge 132 and/or trailing edge 134.

In the arrangement shown, the leading edge 132 has a beveled edge 136 that extends the entire length, or a majority of the length of the leading edge 132 from central hub 124 to point 130. However, it is hereby contemplated to place the beveled edge 136 on any other amount or portion of the leading edge 132. In the arrangement shown, the trailing edge 134 has a beveled edge 138 that extends a portion of the length of the trailing edge 134 and is positioned near or adjacent the base and terminates prior to point 130. In the arrangement shown, beveled edge 136 on leading edge 132 and beveled edge 138 on trailing edge 134 are positioned on opposite sides or faces of tine 128. Alternatively, beveled edges 136 and 138 are positioned on the same face or side of tines 128. Any angle of beveling is hereby contemplated for use, however an angle of between 0 and 60 degrees has been used with success and more specifically between 10 and 50 degrees. The beveling on the leading edge 132 serves to cut into the soil which reduces the friction or resistance, whereas the beveling on the trailing edge 134 serves to reduce the friction as the tine leaves the soil.

Figure 15:
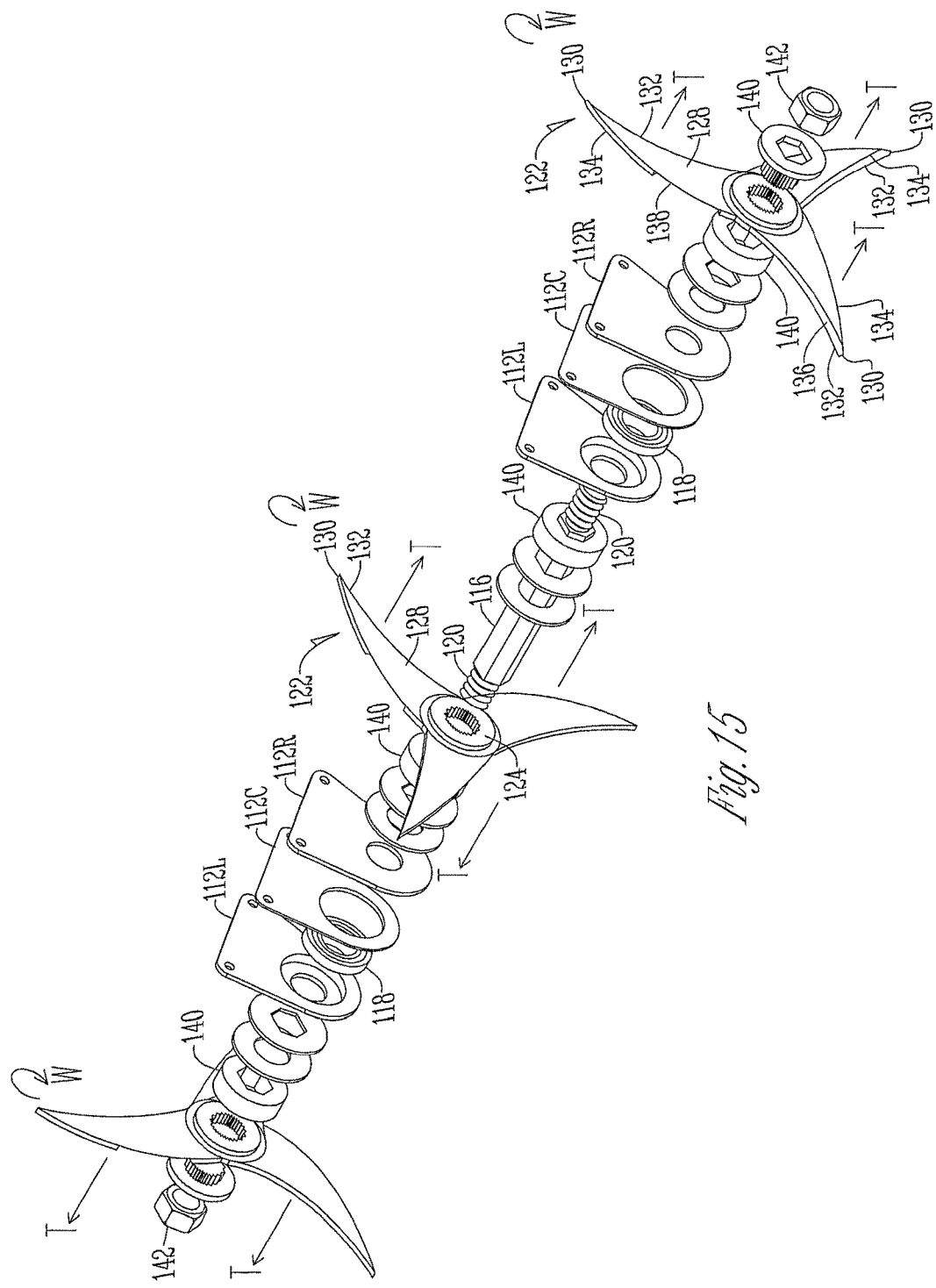
FIG. 15 is an exploded perspective view of the roller assembly of the third and fourth embodiments.
Figure 16:
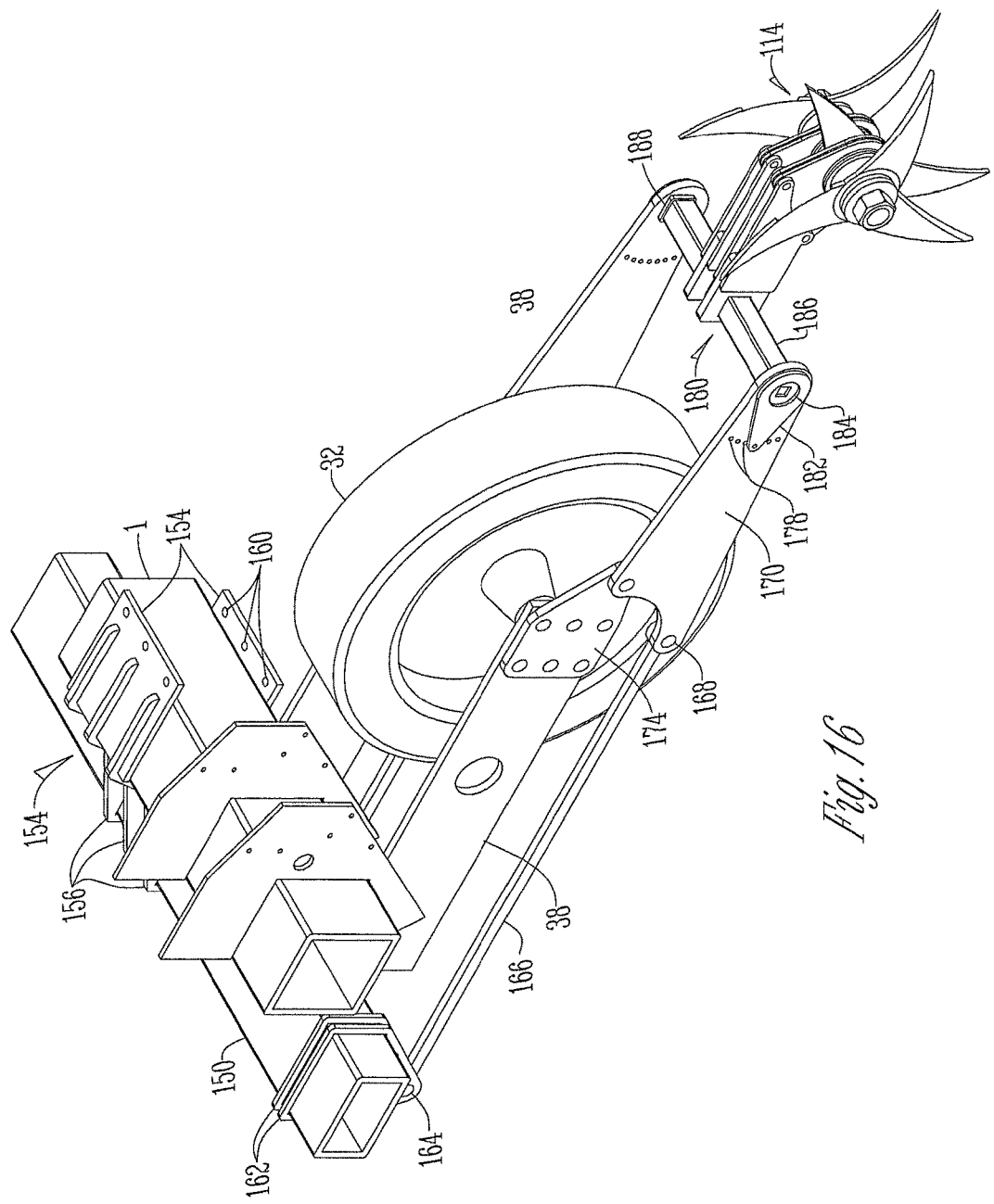
FIG. 16 a perspective view of the fourth embodiment of a tillage device for an agricultural implement.

In one arrangement, tines 128 are straight, flat and planar and therefore extend outwardly from arbor shaft 116 in a straight, flat and planar fashion. That is, in these arrangement tines 128 are aligned and extend perpendicular to the axis or rotation of arbor shaft 116. In an alternative arrangement, as is shown, tines 128 are not straight, flat and planar and instead tines 128 are tilted and/or twisted. Tilted herein means to be bent or tilted out of perpendicular alignment with the axis of rotation. As is shown in FIG. 15, the tines 128 are tilted out of perpendicular alignment with the axis of rotation in the direction of arrows T. In this arrangement, the outside blade assemblies 122 are tilted outward, whereas the centrally positioned blade assembly 122 shares a combination of left and right tilted tines 128. It is hereby contemplated that any combination of tilted tines can be used. In addition, any amount of tilting is also hereby contemplated for use, however tilting of between 0 and 20 degrees has been used with success. Tilting the outwardly positioned tines 128 outwardly allows for greater surface area to be covered by the blade assemblies. The tines 128 can tilt at a single point, meaning once tilted they extend in straight fashion from the point of tilting. Alternatively, tines can tilt along their length at multiple points of tilting or they can arcuately curve to accomplish the tilting.

It is also hereby contemplated to twist tines 128. Twist herein means to be bent or curve out of being straight, flat and planar as the tines 128 extend from their base to their tip 130. As is shown in FIG. 15, the tines 128 are twisted either in clockwise or counterclockwise fashion along arrows W.

Any combination of clockwise and counterclockwise twisted tines are hereby contemplated for use. That is, in one arrangement all tines 128 on a blade assembly 122 can be twisted the same direction (CW or CCW), or alternatively a combination of twisting can be used, some one direction whereas others are twisted in the opposite direction, whereas others may not be twisted at all. In addition, any amount of twisting is also hereby contemplated for use, however twisting of between 0 and 20 degrees has been used with success. Twisting can be combined with tilting. That is, some tines 128 can be tilted one direction and twisted another direction, whereas other tines 128 are tilted one direction yet twisted in the opposite direction. In addition the amount of tilting and twisting can be varied, as can the length, size, shape and design of the tines 128 as well as the angle and placement of beveling. Therefore, an endless combination of tines 128 can be developed to form blade assemblies 120, each suitable for different field conditions.

The roller assembly 114 is formed by positioning the central blade assembly 122 between the pairs of yokes 110. Spacers 140 are positioned adjacent either side of the central blade assembly 122 to maintain proper spacing with respect to yokes 110 and swing arms 74. Spacers 140 are formed on any suitable size, shape and design, and can be formed of one or more conventional washers, rubber, plastic or metallic bushings, or any other device. Next, arbor shaft 116 is inserted through the openings in spacers 140 and central hub 124 of the central blade assembly which holds the arbor shaft 116, spacers 140 and central blade assembly 122 in alignment with one another. Next, the arbor brackets 112L, 112C and 112R are formed with bearings 118 positioned therein. These arbor brackets 112 are positioned over arbor shaft 116 adjacent the outward sides of spacers 140 and central blade assembly 122 and the arbor brackets 112 are affixed to the rearward ends of yokes 110. Next, an additional spacer 140 is placed outward of the arbor brackets 112 and outward blade assemblies 122 are installed over the arbor shaft 116. Next, an outward spacer 140 is positioned over the arbor shaft 116 outward of the outward blade assemblies 122 and a nut 142 is tightened over the outward threaded ends 120 of arbor shaft 116 thereby tightening and holding all components of the roller assembly 114 together. Additional washers or spacers 140 can be used to accomplish proper spacing and alignment.

As is seen best in FIG. 12, the blade assemblies 122 are equally staggered with respect to one another to provide smooth and even tilling of the soil. That is, if each blade assembly 122 includes three tines 128 which are evenly spaced to one another (e.g. points 130 are 120 degrees from one another) and three blade assemblies 122 are positioned over arbor shaft 116, then a point 130 of a blade assembly is positioned approximately every 40 degrees thereby providing even, smooth and effective tillage.

In operation, the third embodiment, depicted in FIGS. 11-15 is connected to the frame 1 of agricultural implement 30 behind and in alignment with one or more wheels of the tractor 24 or agricultural implement 30. Installation is affected by placing the L-shaped lower portion 54 of frame mounting members 52 on the lower and forward side of frame 1, and placing strap 56 on the rearward and upper sides of frame 1 and tightening the two components together through nuts 60 over ends 58. Next, a source of power is connected to cylinder 80, such as a source of pressurized oil, air or the like, or a conventional electrical connection. Once activated, the cylinder 80 forces the swing arms 74 upward and downward between an engaged position, wherein the tines 128 of the roller assembly 114 engage the soil and a disengaged position wherein the tines 128 do not engage the soil. As the cylinder 80 operates, the swing arms 74 pivot on second shaft 72 and the head 100 pivots along with struts 98 and fourth shaft 94. The user can operate the cylinder 80 to apply the desired position and down force to accomplish optimal tillage.

As the tractor 34 passes through the field, the wheels 35 of the tractor 34 cause compaction in the soil of the field and create their own compression marks. However, because the tractor wheels 35 tend to be large in width and diameter and have a low compression level, these compression marks tend to have a low compression level or lower compression level when compared to the wheels 32, or especially the centrally positioned wheels 32 (e.g. see the four centrally positioned wheels 32 in FIG. 21) of the planter 30. These wheels 32 of planter 30 tend to provide substantial compression because these wheels 32 are restricted by their size and width and therefore tend to be substantially smaller in width and diameter than the wheels 35 of tractor 34. This, in many arrangements, is because these wheels 32 connected to planter 30 are required to fit between row units 37 of planter 30, which must be positioned at specified spacing to one another (as an example most row units for corn planting are positioned at 30" to one another, center-to-center). Therefore, the wheels 32 of planter 30 must fit within this spacing between row units 37, while providing enough room for row units 37. These limitations tend to cause the wheels 32 of planter 30 to be relatively narrow. However, due to the substantial size and weight of planter 30, these wheels 28 tend to carry a substantial burden, thereby causing substantial compaction problems, especially at the centrally positioned wheels 32.

As the tractor 34 pulls the planter 30 through the field, the roller assembly 114 rolls and the tines 128 intermittently engage the soil. When obstacles are engaged by the roller assembly 114 the swing arms pivot on second shaft 72 to compensate for these variables. As the roller assembly 114 rolls, the beveled leading edge 132 slices into the soil thereby reducing entry friction. As the tines 128 pass through the soil, the twist and the tilt of the tines 128 disturbs the soil thereby breaking up pockets of compaction. As the tine 128 exits the soil the beveled trailing edge 134 reduces exit friction.

Fourth Embodiment

An alternative fourth embodiment is presented with reference to FIGS. 16-21. This fourth embodiment is often used when it is required to position the tillage device 28 behind a tilting wheel 32 which is held by a wheel brace 38 which is connected to the tube frame 1 of a planter. The wheel brace 38 is tilted so as to raise and lower a planter into and of out planting position.

In this fourth embodiment, the tillage device 28 includes tool bar 150. Tool bar 150 is formed of any suitable size and shape. In one arrangement, tool bar 150 is a generally square or rectangular pipe or tube that extends a length between opposing ends 152. In one arrangement, tool bar 150 extends the length to cover one tilting wheel 32 and one set of wheel braces 38. In an alternative arrangement, tool bar 150 extends the length to cover two tilting wheels 32 and two sets of wheel braces 38. In yet another alternative arrangement, tool bar 150 extends the length to cover three or more tilting wheels 32 and a corresponding number of sets of wheel braces 38. Going forward, tool bar 150 will be described as covering two tilting wheels 32 and two sets of wheel braces 38, as this is a common arrangement, however the invention is not so limited.

One or more tube frame brackets 154 are connected to the tool bar 150. In one arrangement, a single tube frame bracket 154 is used and is positioned approximately centrally on the tool bar 150 and is positioned between a pair of wheels 32 and wheel braces 38. Tube frame bracket 154 is formed of any suitable size, shape and design and serves to removably and replaceably connect tool bar 150 to tube frame 1 of the agricultural implement 30. In one arrangement, as is shown, tube frame brackets 154 include three tool bar mounting plates 156 positioned in parallel spaced relation to one another. Tool bar mounting plates 156 have an opening in their lower forward end that receives tool bar 150 within close tolerances. Tool bar mounting plates 156 extend upward and rearward therefrom and have a U-shaped or C-shaped opening that faces rearward that is sized and shaped to receive tube frame 1 of agricultural implement within close and tight tolerances. Surface plates 158 are mounted to the mounting plates 156 within the C-shaped or U-shaped opening. These surface plates 158 help to provide strength and rigidity to the plurality of mounting plates 156, and also provide increased surface area for engagement between the tool bar 150 and the tube frame 1, which provides a stronger and more accurate connection therebetween. Tool bar mounting plates 156 are connected to tool bar 150 by any means known in the art such as welding or forming the components out of a single piece of material. Similarly, surface plates 158 are connected to tool bar mounting plates 156 by any means known in the art such as welding or forming the components out of a single piece of material. A plurality of openings 160 are positioned in spaced alignment along the rearward edge of the upper and lower surface plates 158 which receive straps or fasteners, such as bolts, which extend between the upper and lower surface plates 158 and tightened together thereby securing the tube frame 1 within tube frame bracket 154.

A plurality of linkage arm brackets 162 are positioned along tool bar 150. In one arrangement, as is shown, a pair of linkage arm brackets 162 are positioned in parallel spaced alignment on either side of wheel 32 and wheel brace 38. The linkage arm brackets 162 have an opening adjacent their upper end which is sized and shaped to receive tool bar 150 within close tolerances. Linkage arm brackets 162 are connected to tool bar 150 by any manner or method such as welding, or forming the components out of a single piece of material. Linkage arm brackets 162 have a tab which extends downwardly from the tool bar 150. This tab includes an opening adjacent its bottom end which receives a first linkage arm shaft 164. First linkage arm shaft 164 extends between a pair of opposing linkage arm brackets 162. The upper end of a linkage arm 166 is positioned between these pairs of linkage arm brackets 162 such that the first linkage arm shaft 164 extends through the upper end of the linkage arm 166. Linkage arm 166 tilts or pivots on the first linkage arm shaft 164 to adjust to angular positioning between a raised and a lowered planter position. Linkage arm 166 is formed of any suitable size, shape and design. In one arrangement, as is shown, linkage arm 166 is an elongated bar, or rod.

Linkage arm 166 connects at its lower end to a second linkage arm shaft 168. Second linkage arm shaft 168 connects the lower end of linkage arm 166 to swing arm 170 and like first linkage arm shaft 164, allows for tilting or rotation of the linkage arm 166.

Swing arm 170 is formed of any suitable size, shape or design. In one arrangement, as is shown, swing arm 170 is generally flat, straight and planar in shape and extends from a forward end, having a concave curved shape, and a rearward end having a concave rounded shape. The forward end of swing arm 170 includes a lower opening, which receives second linkage arm shaft 168, and an upper opening which receives fastener 172. Fastener 172 is any form of a device that connects two devices together while allowing angular rotation between the two components, such as a bolt, shaft or screw. Fastener 172 connects the upper forward end of swing arm to wheel brace mounting plate 174. Wheel brace mounting plate 174 is formed of any suitable size, shape and design and serves to connect swing arm 170 to wheel brace 38. In the arrangement shown, wheel brace mounting plate 174 is generally flat, straight and planar and includes a plurality of openings which receive conventional fasteners, such as bolts or screws that connect wheel brace mounting plate 174 to wheel brace 38.

The rearward end of swing arm 170 includes a torsion shaft opening 176 and a plurality of adjustment openings 178. Torsion shaft opening 176 is sized and shaped to allow torsion shaft 180 to extend there through. Positioned a distance forward of the torsions shaft opening 176 are a plurality of adjustment openings 178 that are aligned in curved vertical spaced alignment from the upper side of swing arm 170 to the lower side of swing arm 170. A torsion shaft adjustment plate 182 is connected to the rearward end of swing arm 170.

Torsion shaft adjustment plate 182 is formed of any suitable size, shape and design. In the arrangement shown, torsion shaft adjustment plate 182 is generally flat, straight and planar in shape with a pointed forward end and a rounded rearward end having a recessed collar 184 that is generally circular in shape and protrudes inward adjacent the rearward end. Collar 184 is sized and shaped to be received within close tolerance of torsion shaft opening 176 and allow for rotation therein. When collar 184 is positioned within torsion shaft opening 176, an opening in the forward end of torsion shaft adjustment plate 182 aligns with the adjustment openings 178 in swing arm 170. This arrangement allows for angular adjustment of the torsion shaft 180 by selecting various adjustment openings 178 and tightening the torsion shaft adjustment plate 182 to the swing arm 170 through a conventional fastener.

Torsion shaft 180 is formed of any suitable size, shape and design. In the arrangement shown, torsion shaft 180 has an elongated square shaft 186 that terminates in end plates 188 with square heads 190 that extend outwardly therefrom. In one arrangement, torsion shaft 180 is a solid piece of material that is generally rigid. In an alternative arrangement, opposing square heads 190 are connected to one another and/or to the shaft 186 by means of a flexing member (not shown) such as a spring or the like. This flexing member allows heads 190 to slightly rotate with respect to the shaft 186, providing some flexibility or give to the system when variations in the field are encountered.

Heads 190 are received in an opening in torsion shaft adjustment plate 182, more specifically within the collar 184 of the torsion shaft mounting plate 182. In one arrangement, these openings are sized and shaped to receive heads 190 within close tolerances so as to not allow heads 190 to rotate within torsion shaft adjustment plate 182. That is, if heads 190 are square, these corresponding openings too are square. In this non-rotational arrangement, if roller assembly 114 encounters a variation in a field, such as a rock or clod of dirt, the roller assembly 114 will spring upward, and the flexing member within torsion shaft 180 will load and allow heads to rotate with respect to shaft 186, thereby providing some flexibility to the system. In addition, the downward position and force can be adjusted by selecting different adjustment openings 178.

A pair of extension arms 192 are connected to shaft 186. Extension arms 192 are formed of any suitable size, shape and design. In one arrangement, as is shown, extension arms have an opening that receives shaft 186 in a non-rotational manner. That is, when shaft 186 is square, these openings are correspondingly square and receive shaft 186 within close tolerances. Extension arms 192 are connected to shaft 186 by any means known in the art, such as welding, fastening or forming the two components out of a single piece of material. These extension arms 192 are positioned in parallel spaced alignment and extend rearward from shaft 186. Extension arms 192 serve in a similar or the same manner to the ends of swing arms 74 described with respect to the third embodiment (FIGS. 11-15). The remaining components of the assembly are similar if not identical to those described with respect to the third embodiment (FIGS. 11-15) and therefore this description will be incorporated herein to avoid redundancy. That is, yokes 110 connect to the rearward end of extension arms 192, in the same manner yokes 110 connect to the rearward end of swing arms 74 in the third embodiment, and the roller assembly 114 is formed in the same manner and connected to the yokes 110 in the same manner as is described with respect to the third embodiment, so on.

In operation, the fourth embodiment, depicted in FIGS. 16-20 is connected to the tube frame 1 of agricultural implement 30 by placing the tool bar 150 in front of a pair of wheels 32 such that the C-shaped or U-shaped opening in the tube frame brackets 154 receive the tube frame 1. In the proper alignment, a pair of linkage arm brackets 162 are positioned on either side of a wheel 32 and corresponding wheel brace 38. Once properly aligned, fasteners are used to tighten tool bar 150 to tube frame 1. In this position, linkage arms 166 are connected at their upper end to linkage arm brackets 162, and at their lower end to the forward end of swing arms 170. Next, the wheel brace mounting plate 174 is fastened to the lower end of the wheel brace 38 and the swing arm 170 is connected to the wheel brace mounting plate 174 by fastener 172. Next, the torsion shaft 180 is inserted within torsion shaft opening 176 of swing arms 170 and the heads 190 are inserted into the openings of collar 184 of torsion shaft adjustment plate 182, which are positioned outside of swing arms 170. Next, the height of the roller assembly 114 is set by fastening the torsion shaft adjustment plate 182 to the appropriate adjustment opening 178 using a conventional fastener. The higher the selected adjustment opening 178, the lower the roller assembly 114 will be positioned; the lower the selected adjustment opening 178, the higher the roller assembly 114 will be positioned.

Figure 17:
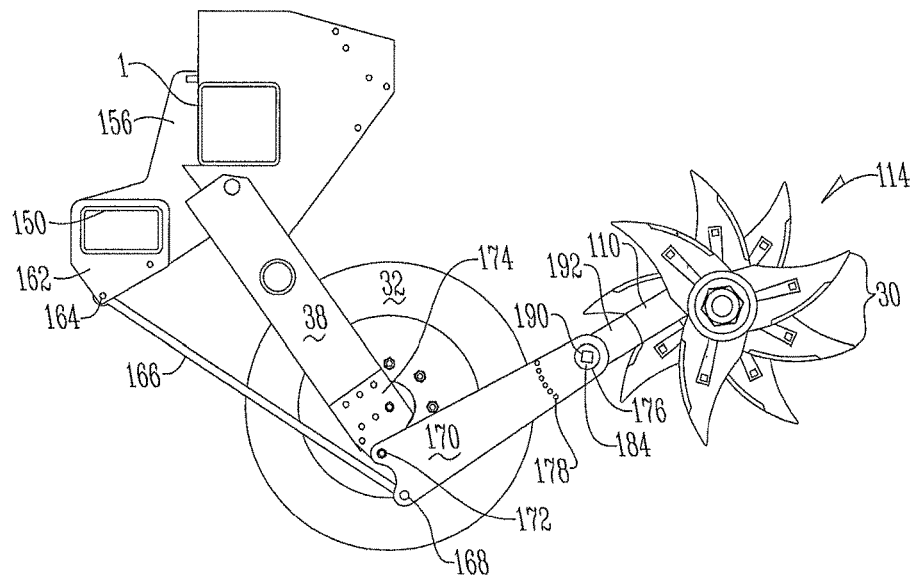
FIG. 17 is a side elevation view of the fourth embodiment shown in FIG. 16, in this view the roller assembly is in a disengaged position.
Figure 18:
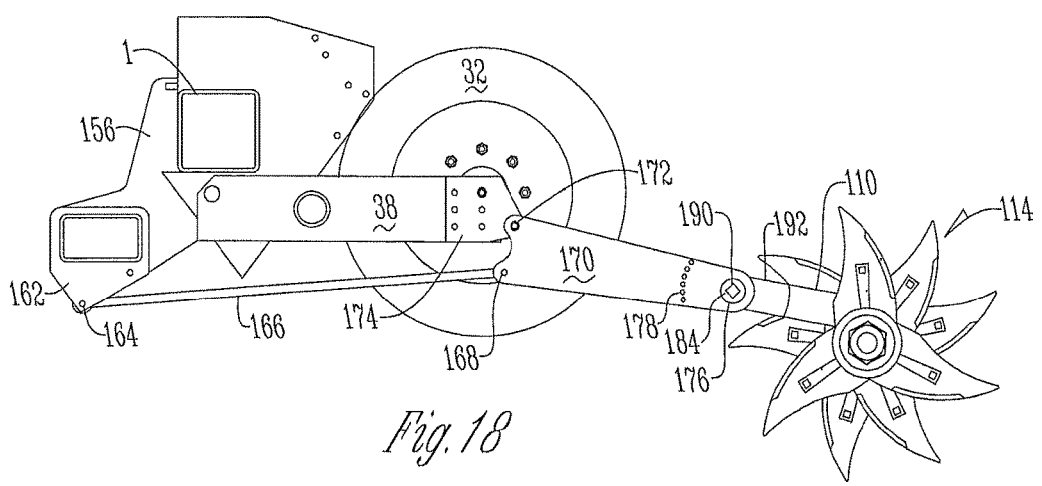
FIG. 18 is a side elevation view of the fourth embodiment shown in FIGS. 16 and 17, in this view the roller assembly is in an engaged position.
Figure 19:
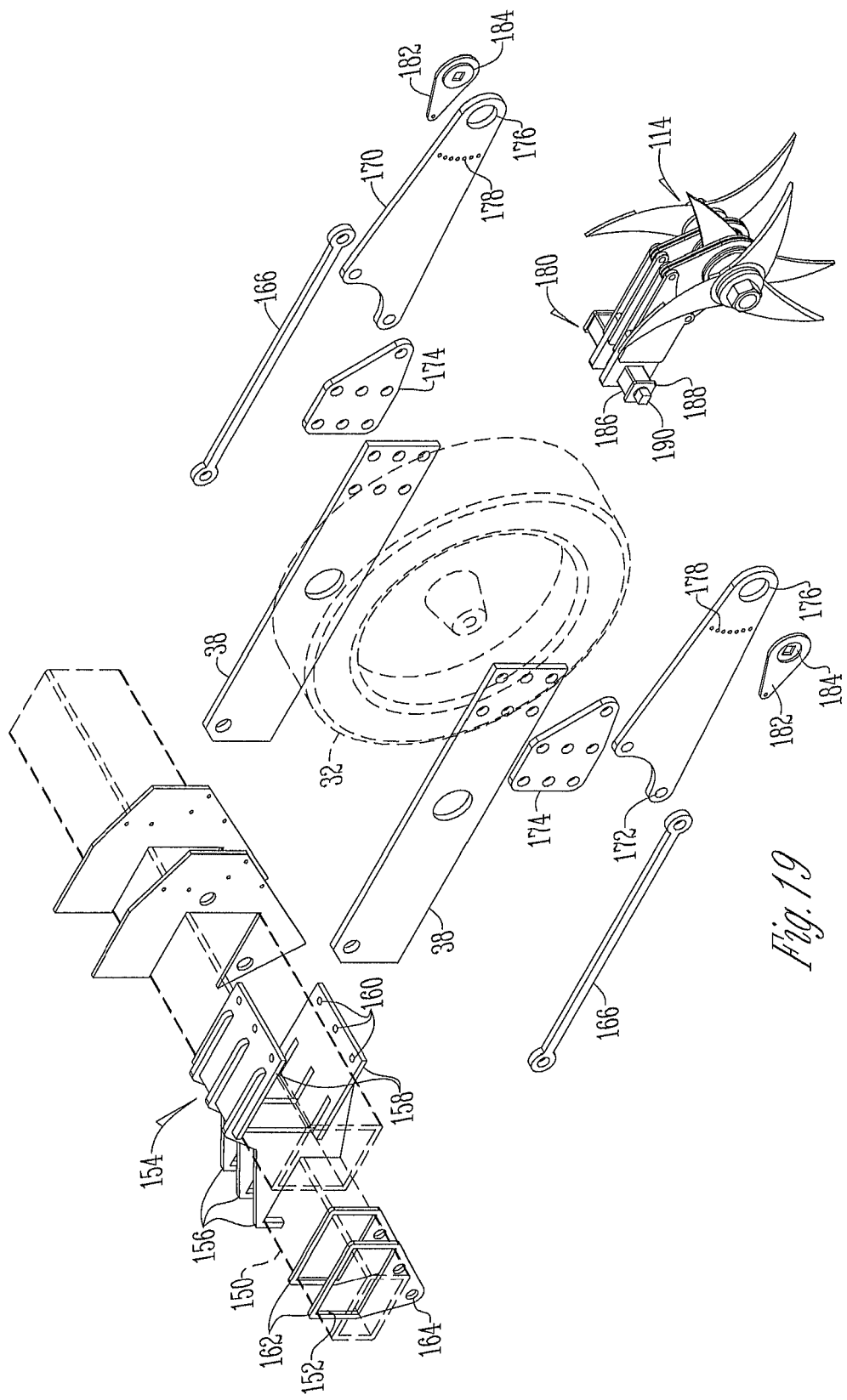
FIG. 19 is an exploded perspective view of the fourth embodiment shown in FIGS. 16-18.
Figure 20:
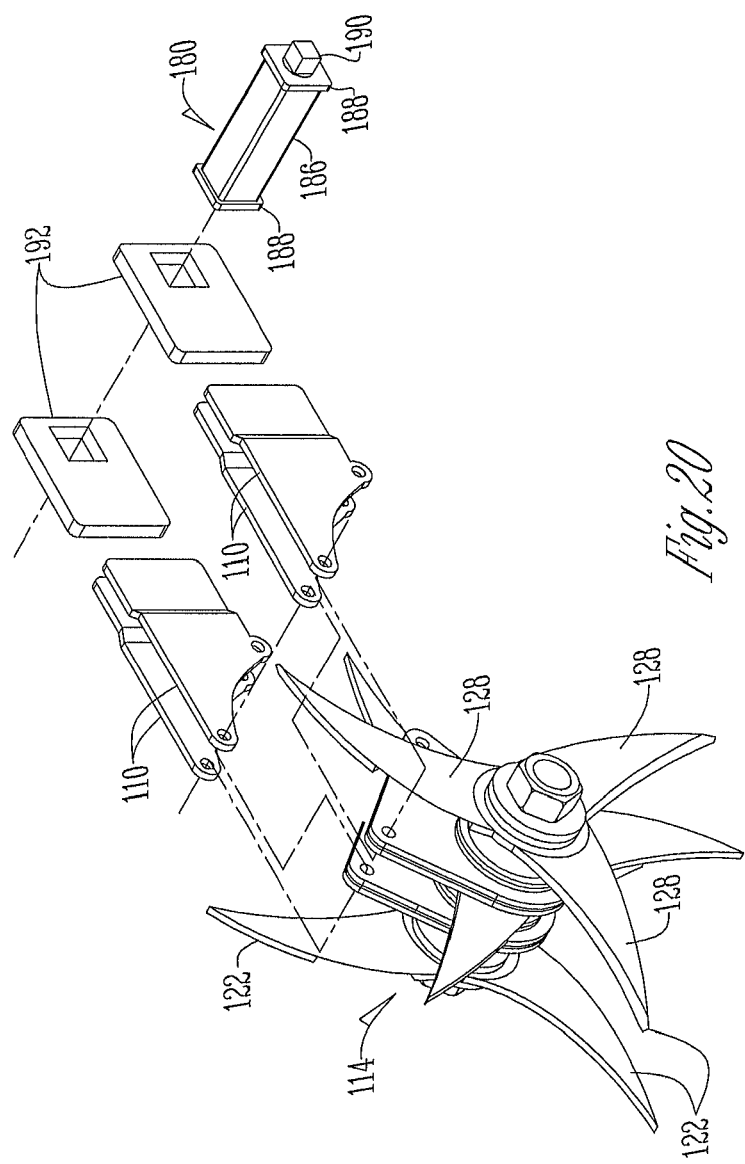
FIG. 20 is an exploded perspective view of the torsion shaft assembly and roller assembly of the fourth embodiment shown in FIGS. 16-19.

Once fully assembled, the roller assembly 114 moves between a disengaged, or raised position (as is seen in FIG. 17) and an engaged, or lowered position (as is seen in FIG. 18) automatically as the planter moves between a non-planting, or raised position (as is seen in FIG. 17) and a planting, or lowered position (as is seen in FIG. 18). More specifically, as the planter is lowered, the wheel brace 38 and wheel 32 extend rearward. This causes linkage arm 166 to pivot on first linkage arm shaft 164 and second linkage arm shaft 168. As linkage arm 166 pivots, the combined effects of the pivoting wheel brace 38 and linkage arm 166 causes swing arm 170 to move into an engaged position. This forces the tines 128 to engage the soil of the farm field and rotate as the agricultural implement 30 is pulled across the fields.

In the event the user does not want the roller assembly to engage the soil when the planter is in a planting position, the user can select the lower-most adjustment opening 178. In this position, even when the swing arms 170 are fully lowered, the roller assembly 114 will not till the soil.

In an alternative arrangement, an engine or motor is operably connected to the roller assembly 114 and actively powers rotation of the roller assembly 114. This arrangement reduces the torque or horsepower required to pull the agricultural implement 30.

Fifth Embodiment

An alternative arrangement is presented with reference to FIGS. 23-30. In this embodiment, tillage device 200 includes a tool bar 202. Tool bar 202 is formed of any suitable size, shape and design. In one arrangement, tool bar 202 is formed in a generally T-shaped member, however any other size, shape and design is hereby contemplated for use. In one arrangement, as is shown, tool bar 202 is formed of generally square or rectangular hollow tubing, however any other structurally rigid frame members are hereby contemplated for use such as angle-iron, I-beams, cylindrical tubing or the like.

In the arrangement shown, T-shaped tool bar 202 includes a laterally extending frame member 204 that extends from a forward end 206, to a rearward end 208, and a cross bar frame member 210 that extends a length between opposing ends 212, wherein the laterally extending frame member 204 and the cross bar frame member 210 are positioned in approximate perpendicular alignment to one another. In this arrangement, the forward end 206 of tool bar 202 is configured to attach to planter 30, tractor 34 or other agricultural implement or vehicle. To facilitate this connection one or more brackets 214 are positioned at or near the forward end 206 of laterally extending frame member 204.

In the arrangement shown, as one example brackets 214 are presented in spaced relation to one another. These brackets 214 are formed of an upper strap member 216 that is sized and shaped to fit around a frame member or piece or part of planter 30, tractor 34 or other agricultural implement or vehicle, and a lower strap member 218 that is connected to frame member 204 that serve as a connection point for upper strap member 216 by conventional fasteners, such as screws, bolts or the like, once upper strap member 216 is positioned around the frame member or piece of planter 30, tractor 34 or other agricultural implement or vehicle.

The rearward end 208 of laterally extending frame member 204 connects to the cross bar frame member 210 by any manner, method or means. In one arrangement, as is shown, laterally extending frame member 204 connects to the cross bar frame member 210 in approximate perpendicular alignment. In one arrangement, the rearward end 208 of laterally extending frame member 204 connects directly to cross brace frame member 210 by any manner, method or means, such as by screwing, bolting, welding or the like. In an alternative arrangement, the rearward end 208 of laterally extending frame member 204 connects directly to forward strap member 220 that is sized and shaped to cradle or hold a portion of cross brace frame member 210. The rearward end 208 of laterally extending frame member 204 connects to forward strap member 220 by any manner method or means such as by screwing, bolting, welding or the like. Once positioned around cross bar frame member 210, forward strap member 220 connects to one or more rearward strap members 222. Forward strap member 220 connects to rearward strap members 222 by any manner, method or means, such as screwing, bolting, welding or the like. Once connected together, forward strap member 220 and rearward strap member 222 sandwich cross bar frame member 210 there between thereby connecting laterally extending frame member 204 to cross bar frame member 210.

In one arrangement, to reduce some of the vibration or shock generated during use of tillage device 200, compressible members 224 are positioned between laterally extending frame member 204 and cross bar frame member 210. Compressible members 224 are any form of a compressible device or object that absorbs or dampens shock or vibration. In one arrangement, as is shown, compressible members 224 wrap around cross bar frame member 210 between forward strap member 220 and rearward strap members 222 and is formed of a tube or layer of compressible material such as rubber, synthetic rubber, compressible plastic, foam, compressible nylon, compressible composite, or the like. In this way, shock or vibration present on cross bar frame member 210 is absorbed or dampened or partially absorbed or dampened by compressible members 224 and therefore the shock or vibration is prevented from being fully transmitted to laterally extending frame member 204 which improves functionality and user comfort and reduces wear and tear.

In one arrangement, cross braces 226 extend at an angle between the rearward end 208 of laterally extending frame member 204 and the forward end of cross bar frame member 210. These cross braces 226 are formed of any suitable size, shape and design and serve to improve the strength and rigidity of the connection between cross bar frame member 210 and laterally extending frame member 204. Cross braces 226 also help to maintain the perpendicular alignment of cross bar frame member 210 and laterally extending frame member 204. In the arrangement shown, cross braces 226, when viewed from above or below are generally triangular in shape and include an upper cross brace 226 and a lower cross brace 226 that are connected together by a center wall 228 that prevents the collection of dirt, dust and debris between the upper cross brace 226 and a lower cross brace 226. In the arrangement shown, the inward edge of cross braces 226 connect to laterally extending frame member 204 and the rearward edge of cross braces 226 connect to the forward side of forward strap member 220. In an alternative arrangement, where the laterally extending frame member 204 directly and rigidly connects to the cross bar frame member 210, the rearward edge of cross braces 226 connect to the forward side of cross bar frame member 210 thereby rigidly connecting the two components.

In one arrangement, laterally extending frame member 204 is generally centrally positioned with respect to the planter 30, tractor 34 or other agricultural implement or vehicle that it is connected to. In this arrangement, cross bar frame member 210 is generally centrally positioned with respect to the laterally extending frame member 204. This symmetry provides balance to the device 200.

Cross bar frame member 210 serves as a mounting place for a plurality of roller assemblies 230. Roller assemblies 230 are formed of any suitable size, shape and design. In the arrangement shown, as one example, roller assemblies include a plurality of blade assemblies 232 that include a plurality of tines 234. In one arrangement, as is shown, blade assemblies 232 are formed of three tines 234, however any number of tines 234 are hereby contemplated for use, such as one, two, four, five, six, seven, eight, nine, ten or more. In one arrangement, blade assemblies 232 are formed of a single solitary unit and therefore are replaced as a single piece; whereas in an alternative arrangement, individual tines are connected, such as by bolting or screwing or the like, to form a blade assembly 232 and in this arrangement, individual tines 234 may be replaced without having to replace the entire blade assembly 232. In an alternative arrangement, blade assemblies 232 are formed of a disk or toothed blade.

In the arrangement shown, roller assembly 230 includes a shaft 236. As one example, shaft 236 is formed of a non-round elongated member. In one arrangement, as is shown, shaft 236 is hexagonal in shape, however any other shape is hereby contemplated for use such as square, rectangular, triangular, hexagonal, heptagonal, octagonal, or any other non-round shape. In this arrangement, blade assemblies 232 include a similarly shaped opening 238 at or about their center. That is, where shaft 236 is hexagonal in shape, openings 238 are similarly hexagonal in shape and sized to slide over shaft 236 within close and tight tolerances. One end of shaft 236 includes a stop 240, which in one arrangement as is shown, is disc shaped, and the opposite end terminates in a threaded end 242.

In the arrangement shown, roller assembly 230 is formed of three blade assemblies 232 that are positioned in parallel spaced alignment to one another. However any other number of blade assemblies 232 are hereby contemplated for use such as one, two, four, five, six, seven, eight, nine, ten or more. In this arrangement, where three blade assemblies 232 are used, a bearing assembly 244 is positioned on either side the centrally positioned blade assembly 232. Bearing assemblies 244 are formed of any suitable size, shape and design. In one arrangement, bearing assemblies 244 are formed of a center portion 246 having opening at its middle that is sized and shaped to fit over shaft 236 within close tolerances, and an exterior collar 248 that is generally round or circular in shape when viewed from the side. Bearing assembly 244 includes bearings that allow for relative rotation of the exterior collar 248 with respect to the center portion 246. In one arrangement, these bearings are sealed so as to increase the life span of the bearings, especially in the harsh environment of field work.

Exterior collar 248 includes protrusions 250 therein. Protrusions 250 are formed of any suitable size, shape and design, and serve as a connection point for connecting roller assembly 230 to the other components of the system as is further described herein. In one arrangement, as is shown, protrusions 250 are formed of a cylindrical knob that extends outward from the exterior surface of exterior collar 248, each bearing assembly 244 having a pair of protrusions 250 that are positioned opposite one another and extend in opposite directions to one another.

A spacer 252 is positioned on either side of bearing assemblies 244 and serve to provide appropriate lateral spacing between components of roller assembly 230. Spacers 252 are formed of any suitable size, shape and design. In one arrangement, as is shown, spacers 252 are formed of a circular disc, or washer, having a centrally positioned opening that is sized and shaped to fit the exterior shape of shaft 236. These spacers 252 keep adequate spacing between the center blade assembly 232 and the outwardly positioned blade assemblies 232.

Once blade assemblies 234, spacers 252 and bearing assemblies 244 are positioned over shaft 236 in the proper order, roller assembly 230 is held in place by placing nut 254 over the threaded end 242 of shaft 236 and tightening it in place. Once tightened, a cover 256 having a round exterior surface and a centrally positioned opening that fits the exterior dimensions of nut 254 is placed over the exterior surface of nut 254 and is itself tightened in place. Cover 256 is held in place with one or more fasteners 258. As roller assembly 230 rolls, cover protects the exterior surfaces of nut 254 from wear and tear and also helps to keep roller assembly 230 properly balanced. During use, in one arrangement, the entirety of assembled roller assembly 230 rotates within bearing assemblies 244 as a solid unitary member.

Once assembled, roller assemblies 230 are installed on swing arms 260. Swing arms 260 are formed of any suitable size, shape and design. In one arrangement, as is shown, swing arms 260 are formed of a pair of curved or generally L-shaped members that extend in generally parallel spaced relation to one another when viewed from above or below. Swing arms extend a length from a rearward end 262 to a forward end 264.

The upper rearward end 262 of swing arms 260 are connected together at first shaft 266, which is generally cylindrical in shape and extends in approximate perpendicular alignment between swing arms 260. Swing arms 260 are also connected to one another forward of first shaft 266 at second shaft 268. A stop 269 extends outward of the exterior sides of swing arms 260 between first shaft 266 and second shaft 268. In the arrangement shown, stop 269 is a generally cylindrical protrusion extending outward a distance from the outward side of the swing arms 260. In one arrangement, opposing stops 269 are connected to one another by a shaft that extends between opposing swing arms 260. This arrangement provides additional strength and rigidity as this shaft including stops 269 provides another connection point between opposing swing arms 260.

Roller assemblies 230 connect at or near the forward end 264 of swing arms 260. To facilitate this connection, an opening 270 is positioned near the forward end 264 of swing arms 260 that receive a conventional fastener, such as a screw or bolt (not shown) which connects a lower mounting member 270 to the lower side of the forward end 264 of swing arms 260. Lower mounting member 270 includes an opening or recess that is sized and shaped to receive the forwardly positioned protrusion 250 of bearing assembly 244 thereby connecting the forward side of bearing assembly 244 to swing arms 260. The rearward positioned protrusion 250 of bearing assembly 244 is received in a collar 272, opposite the lower mounting member 270 that is similarly sized and shaped to receive the protrusion 250. In this way, the protrusions 250 of the bearing assembly 244 are connected to the swing arms 260. This connection style is known as or is similar to what is known in the industry as a trunnion style bearing mount.

Guards 274 are connected to the swing arms 260. Guards 274 are formed of any suitable size, shape and design and serve to prevent dirt clods or dirt chunks that are kicked up from the tilling process from landing outside of the tilled area. Or, said another way, guards 274 are designed to prevent dirt clods or dirt chunks from landing on the newly planted row of seeds as large dirt clods or dirt chunks can prevent or inhibit seed growth. In the arrangement shown, guards 274 extend from a rearward end 276 to a forward end 278 and include a plurality of vents 280 or openings therein. Guards 274 are connected to the swing arms 260 by braces 282 that extend outward from swing arms 260 a distance before connecting to guards 274. In the arrangement shown, guards 274, when viewed from the side, cover the majority of the forward to back length of swing arms 260 with the forward end 278 of guards 274 terminating slightly above and slightly forward of the axis of rotation of roller assembly 230, which is an area where dirt chunks or dirt clods tend to be thrown, which helps to direct the dirt clods down in the tilled area.

Swing arms 260 pivotally connect to cross bar frame member 210. More specifically, the rearward end 262 of swing arms 260 pivotally connect to lower brackets 284. Lower brackets 284 are formed of any suitable size, shape and design. In the arrangement shown, the upper edge of lower brackets 284 are configured to engage the lower surface of cross bar frame member 210, by any manner, method or means such as bolting, screwing, welding or the like. When connected to cross bar frame member 210, a pair of lower brackets 284 are positioned in approximate parallel spaced relation to one another. These lower brackets 284 include an opening 286 that is sized and shaped to pivotally receive first shaft 266. When first shaft 266 is received within the openings 286 of opposing lower brackets 284, this provides swing arms 260 with a first, rearward, pivot point.

The forward side of lower brackets 284 include a stop surface 288 therein. Stop surface 288, is sized and shaped to engage and stop 269 and prevent further downward movement of swing arms 260. In the arrangement shown, stop surface 288, when viewed from the side, is formed of a hook-shaped member that is sized and shaped to engage and cradle the generally cylindrical stop 269 at a downward most position.

Swing arms 260 also connect to cross bar frame member 210 by way of upper brackets 290. More specifically, swing arms 260 pivotally connect to upper brackets 290 forward of where swing arms 260 connect to lower brackets 284. Upper brackets 290 are formed of any suitable size, shape and design. In the arrangement shown, the lower edge of upper brackets 290 are configured to engage the upper surface of cross bar frame member 210, by any manner, method or means such as bolting, screwing, welding or the like. When connected to cross bar frame member 210, a pair of upper brackets 290 are positioned in approximate parallel spaced relation to one another. These upper brackets 290 include an opening 292 that is sized and shaped to pivotally receive an axle 294 connected to the upper end of movement member 296. When axle is received within the openings 292 of opposing upper brackets 290, the upper end of movement member 296 is held in place, while also allowing for some rotation or pivoting.

Movement member 296 is formed of any device that causes motion between two components. In the arrangement shown, movement member 296 is a hydraulic or pneumatic cylinder having a housing 298 and a piston 300. However, any other form of a device that causes movement between two components is hereby contemplated for use such as an air bag, a solenoid, an inflatable member, or the like.

In the arrangement shown, the lower end of movement member 296, and more specifically the lower end of piston 300, is pivotally connected to second shaft 268 that extends between opposing swing arms 260. When movement member 296 causes a downward movement or upward movement, the movement member 296 pivots on the upper pivot point at axel 294 and openings 292 and lower pivot point at second shaft 268 thereby adjusting its angle as the angle of the swing arms 260 changes.

Figure 21:
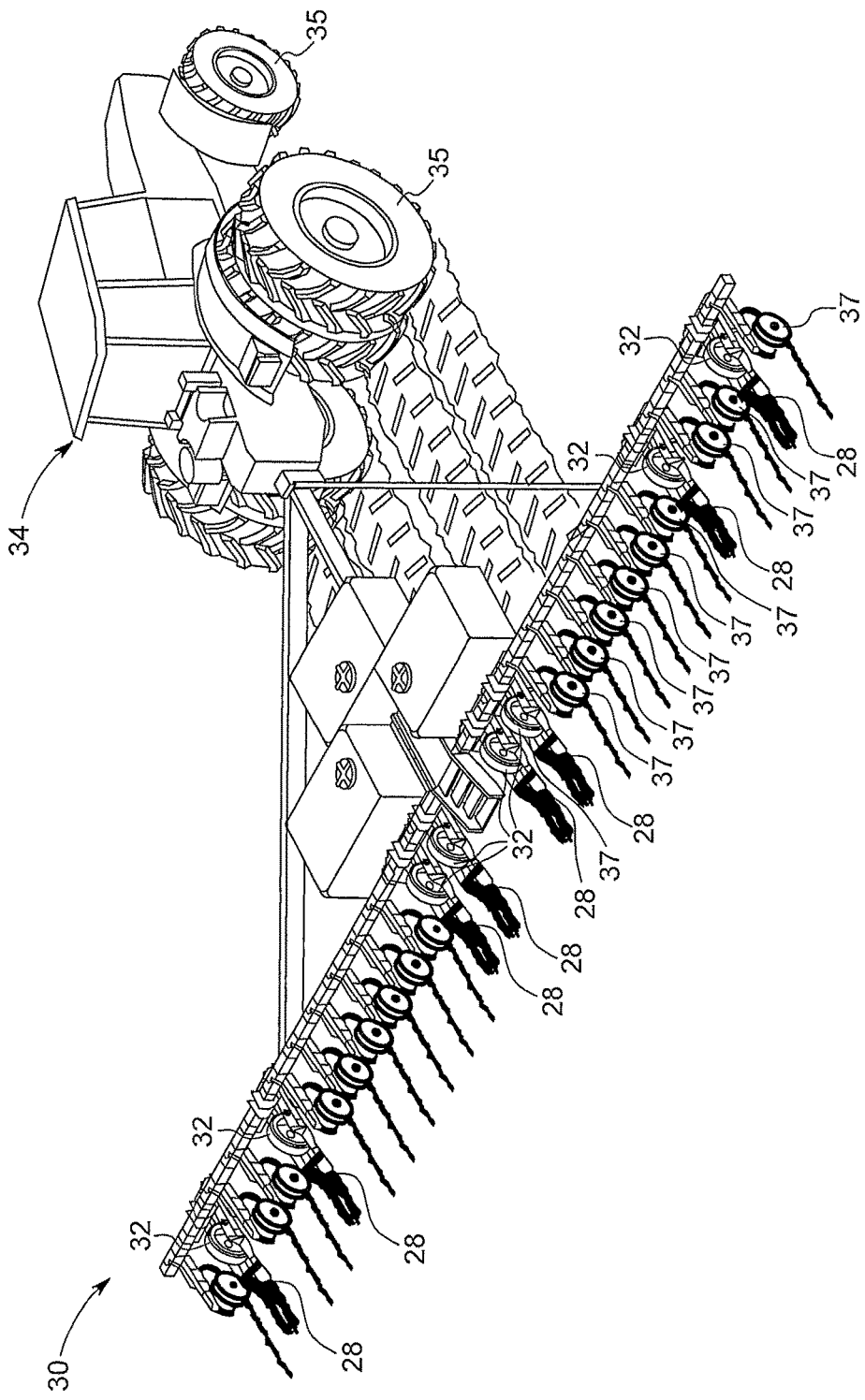
FIG. 21 is a perspective rear view of a tractor pulling an agricultural implement behind the tractor, the agricultural implement having a tillage device positioned in alignment with and behind wheels of the tractor and/or the agricultural implement; in this arrangement the agricultural implement is a planter.

In Operation: Tillage device 200 is connected to an agricultural implement, a tractor, a vehicle or any other device that creates compression marks in the soil of a field. For purposes of providing a clear example, the following description is related to connecting tillage device 200 behind a planter 30, similar to that which is shown in FIG. 21.

The laterally extending frame member 204 is connected approximately at the center of planter 30 by brackets 214. That is, upper strap members 216 are placed around a frame member of the planter 30 and then affixed to lower strap members 218. Once installed, laterally extending frame member 204 extends rearward of planter 30 a distance. Cross bar frame member 210 extends outward from laterally extending frame member 204 a distance.

Roller assemblies 230 are positioned along the length of cross bar frame member 210 in spaced alignment to one another. In the arrangement shown, two roller assemblies 230 are positioned on either side of laterally extending frame member 204. These roller assemblies 230 are positioned in alignment with the weight bearing center wheels 32 of planter 30, while being positioned between the row units 37 of the planter. In this position, when moved to an engaged position, roller assemblies 230 till the compression marks formed in the soil of the field, while not disturbing the adjacent areas that are planted by row units 37.

The roller assemblies 230 are moved between a disengaged position, where the tines 234 of roller assemblies 230 do not penetrate and till the ground, and an engaged position, where the tines 234 of roller assemblies 230 penetrate and till the ground, by activation of movement member 296. When in a disengaged position, and movement member 296 is activated, piston 300 moved downward and outward from housing 298. This downward movement causes the first shaft 266 to pivot within the openings 286 of lower brackets 284. This downward movement continues until the tines 234 engage the ground at the desired depth or the stops 269 engage the stop surfaces 288 in the lower brackets 284.

When tilling the ground, when the tines 234 engage a bump, rock or other aberration in the field, the movement member 296 allows the swing arms 260 to pivot upon first shaft 266 to accommodate the aberration. That is, the movement member 296 serves as a shock absorber and allows the sing arms 260 to adjust to varying field conditions which reduces wear and tear on the system and improves tilling.

As the tines 234 rotate and till the ground, dirt clods or dirt chunks tend to be kicked up. These dirt clods or dirt chunks tend to engage the inward surfaces of guards 274 which tend to direct the dirt clods or dirt chunks back to the tilled area and thereby prevents them from entering the adjacent areas that were recently planted. This prevents these dirt chunks or dirt clods from interfering with the growth of the recently planted seeds.

As the tillage device 200 operates, and the roller assemblies 230 engage the ground, vibrations are generated in the cross bar frame member 210. These vibrations are partially dampened or absorbed by the compressible member 224 placed between the cross bar frame member 210 and the laterally extending frame member 204.

While the roller assemblies 230 are shown extending forward from the cross bar frame member 210, it is hereby contemplated that the roller assemblies 230 can similarly extend rearward of the cross bar frame member 210 and provide similar functionality.

Balancing of the System: As is described herein, in one arrangement, tines 234 are tilted slightly to improve tilling as the roller assembly 230 rotates. In one arrangement, care is taken to balance the roller assemblies 230 so as not to cause the tillage device 200 to track or lean to one direction or the other. As an example of balancing the system, in the arrangement shown where four roller assemblies 230 are used, each roller assembly 230 having three blade assemblies 232, each blade assembly having three tines 234 the centrally positioned blade assembly 232 has tines 234 that tilt in the opposite direction from the two outwardly positioned blade assemblies 232. That is, if the center blade assembly 232 includes tines 234 that tilt left, then the outwardly placed blade assemblies 232 tilt right. Care is also taken to ensure that the center blade assembly 232 of adjacent roller assemblies 230 tilt in opposite directions to one another. That is, where four roller assemblies 230 are used, the center blade assemblies 232 are as follows (1) Tilt Left, (2) Tilt Right, (3) Tilt Left, and (4) Tilt Right; or alternatively (1) Tilt Right, (2) Tilt Left, (3) Tilt Right, and (4) Tilt Left; or alternatively (1) Tilt Left, (2) Tilt Right, (3) Tilt Right, and (4) Tilt Left; or alternatively (1) Tilt Right, (2) Tilt Left, (3) Tilt Left, and (4) Tilt Right.

As is also shown, to provide smooth operation of the roller assembly 230 the tips of the tines 234 are equally spaced from one another. That is, in one arrangement, when viewed from the side, in the arrangement where roller assembly 230 includes three blade assemblies 232 and each blade assembly 232 includes three tines 234 each of the tips of the nine tines 234 are spaced equally from one another or are approximately 40 degrees from one another, each tip being spaced an equal distance from the adjacent tip.

Figure 22:
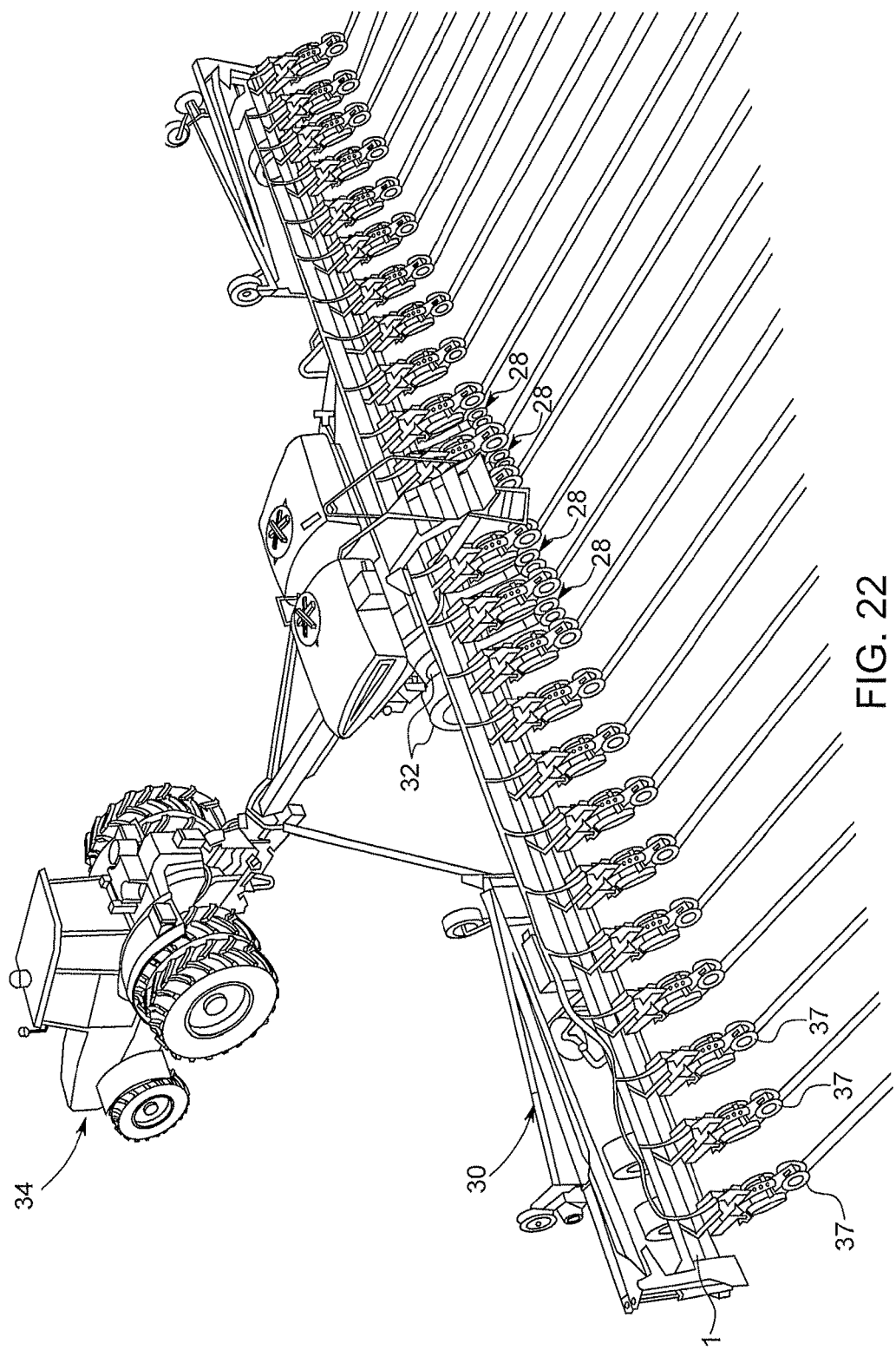
FIG. 22 is a perspective rear view of a tractor pulling an agricultural implement behind the tractor, the agricultural implement having a four tillage devices of the embodiment shown in FIGS. 11-15, the tillage devices positioned in alignment with and behind the weight bearing wheels of the tractor and/or the agricultural implement; in this arrangement the agricultural implement is a planter of a different configuration as that shown in FIG. 21, the tillage devices are attached to the frame of the planter and positioned in alignment behind the wheels positioned below the bulk seed holding containers.
Figure 23:
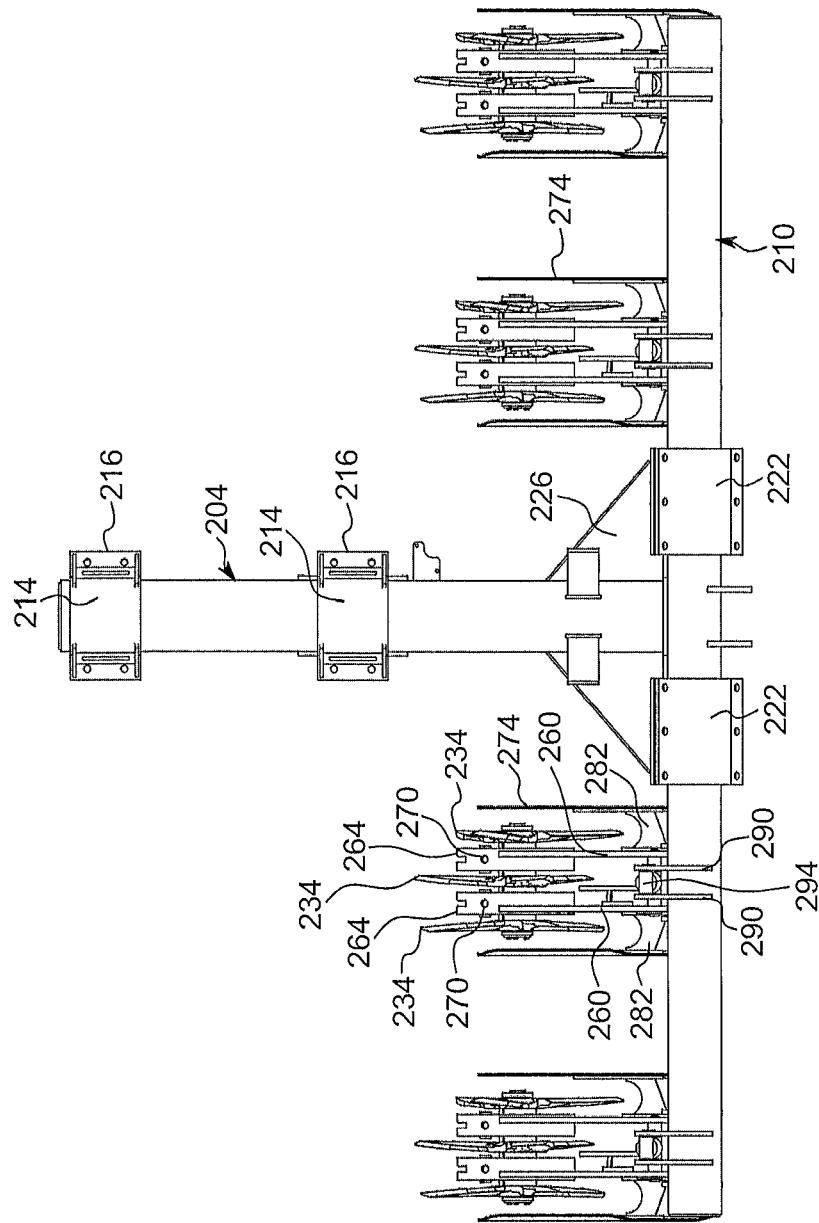
FIG. 23 is a top elevation view of a fifth embodiment of a tillage device, the view shows a tool bar that is connected to a tractor, implement or other agricultural vehicle and extends there behind, a plurality of roller assemblies are connected to the tool bar and extend forward therefrom, the roller assemblies are connected to a piston system or other movement device which moves the roller assemblies from an engaged position to a disengaged position.
Figure 24:
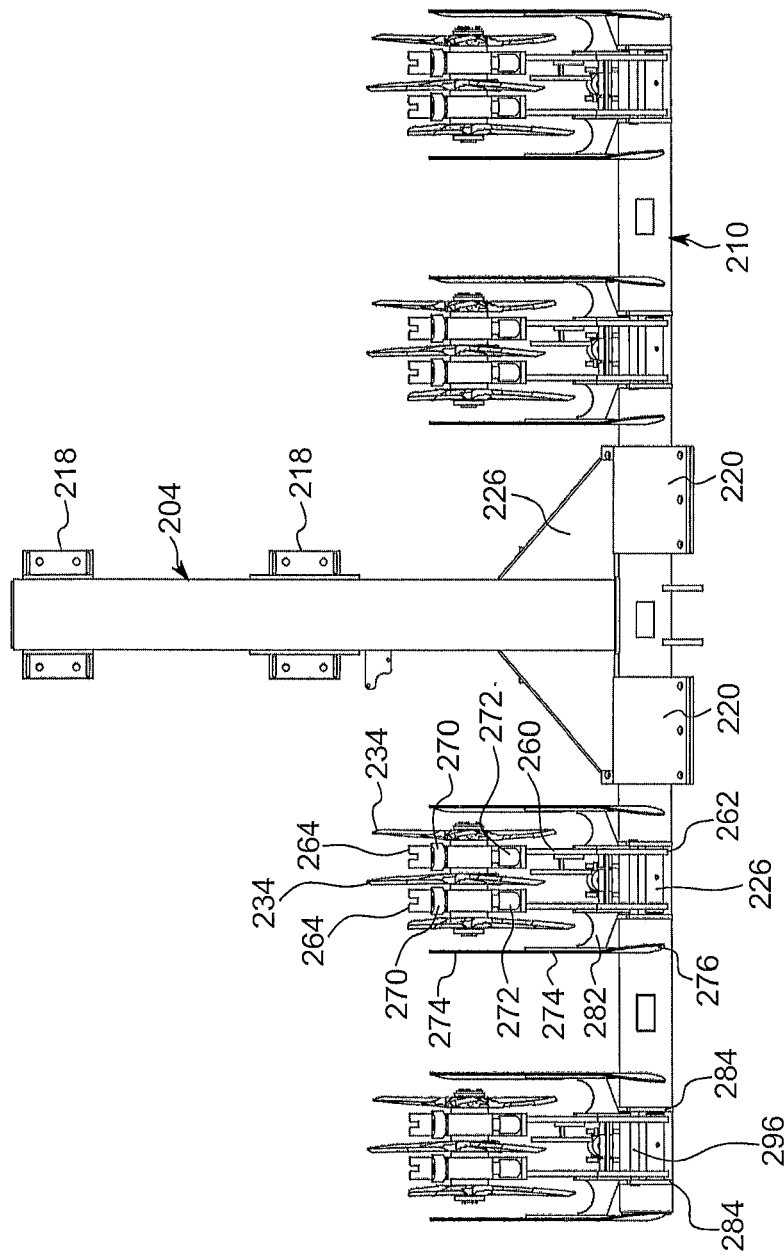
FIG. 24 is a top elevation view of the arrangement shown in FIG. 23.
Figure 25:
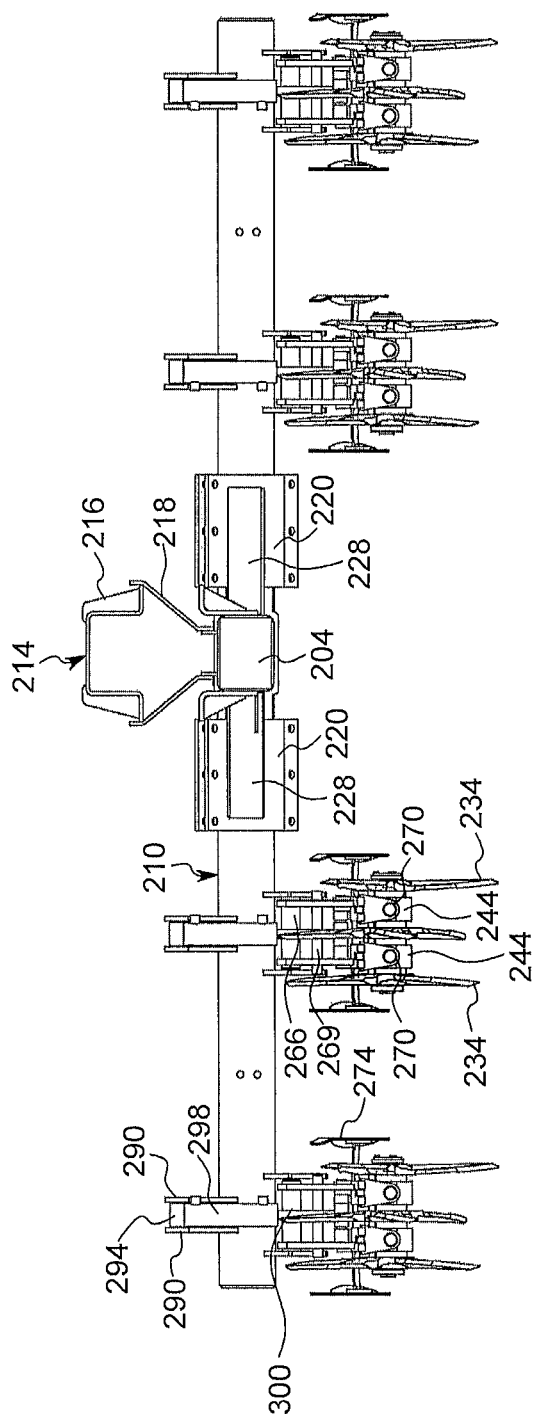
FIG. 25 is a front elevation view of the arrangement shown in FIGS. 23 and 24.
Figure 26:
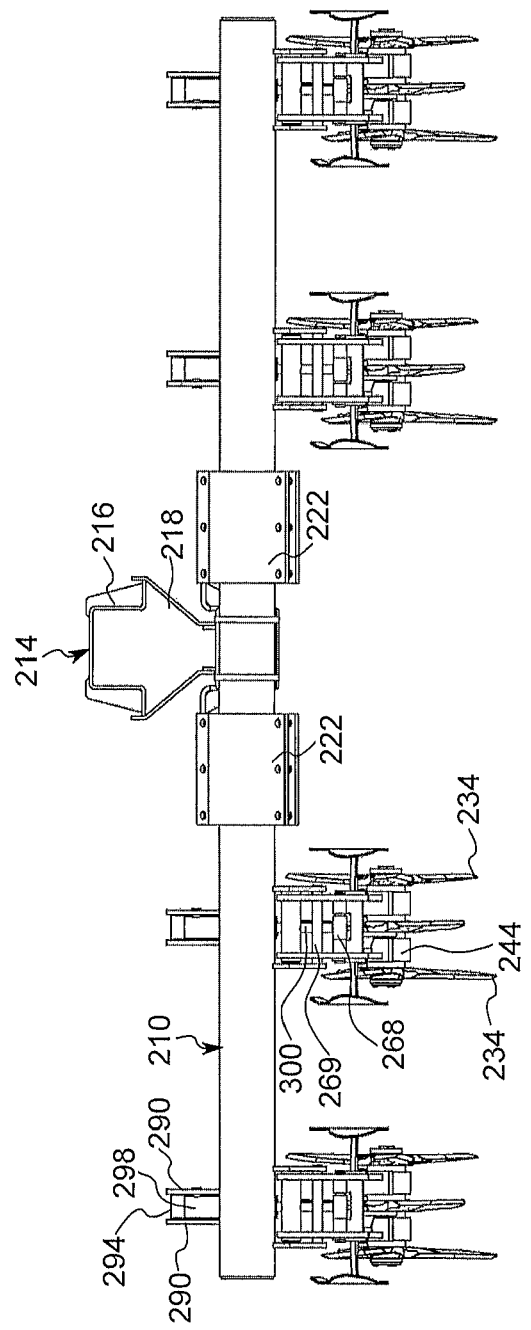
FIG. 26 is a rear elevation view of the arrangement shown in FIGS. 23-25.
Figure 27:
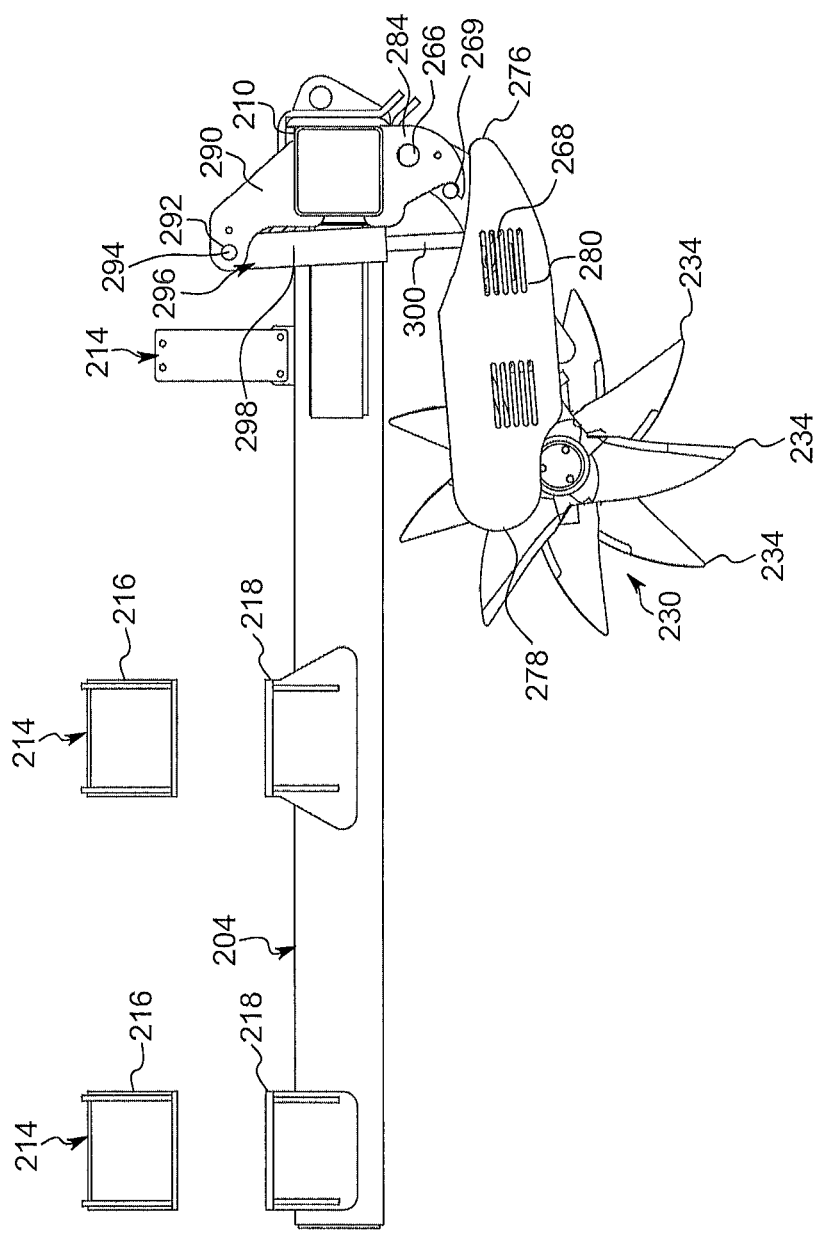
FIG. 27 is a side elevation view of the arrangement shown in FIGS. 23-26.
Figure 28:
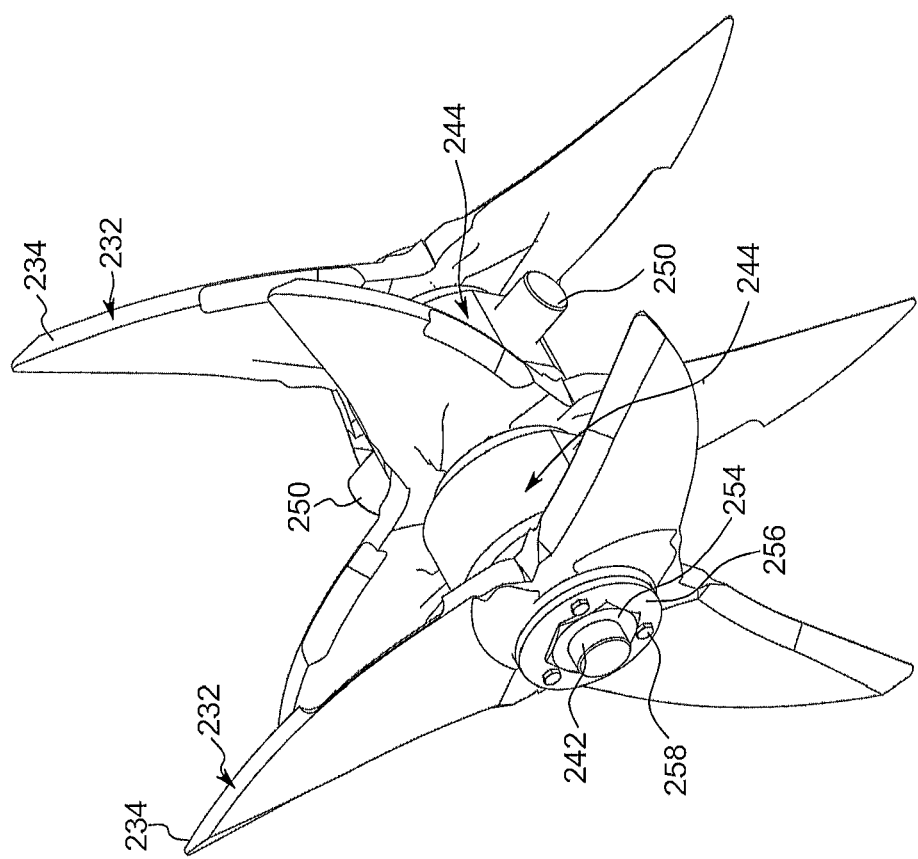
FIG. 28 is a close-up perspective view of a roller assembly shown in FIGS. 23-27.
Figure 29:
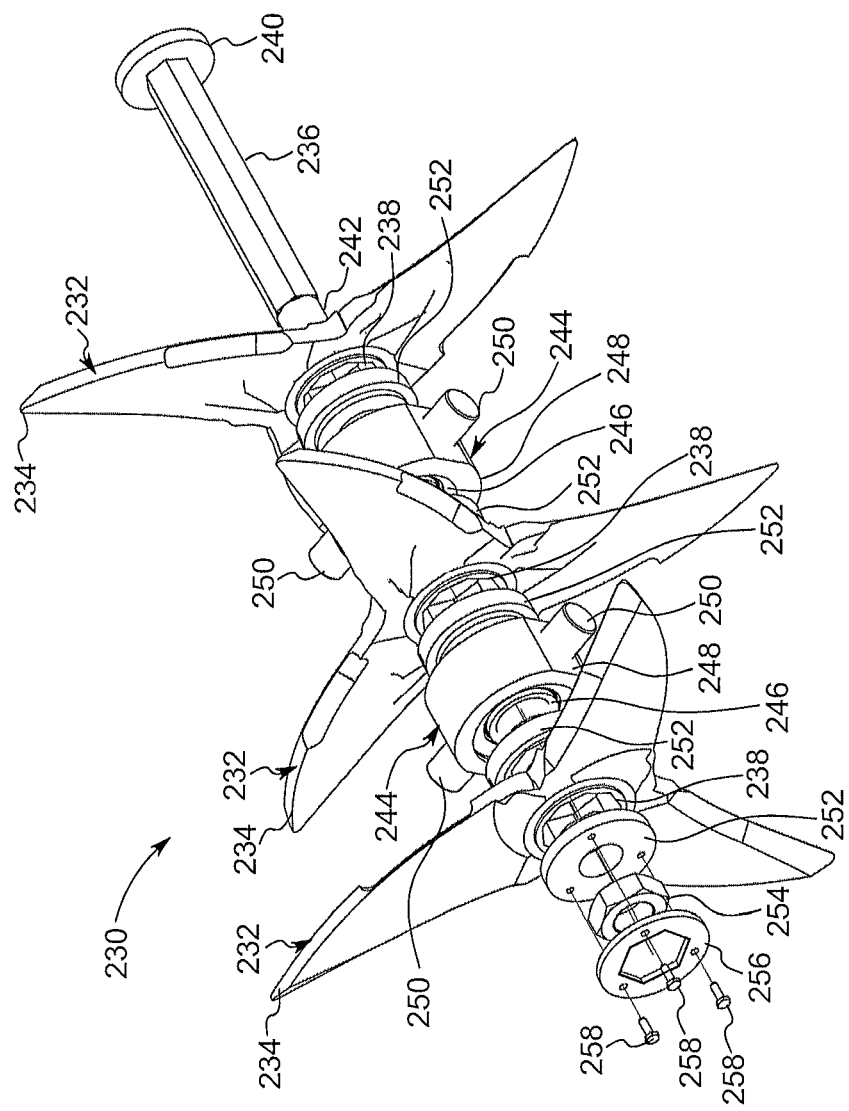
FIG. 29 is a close-up exploded perspective view of the roller assembly shown in FIGS. 23-28.
Figure 30:
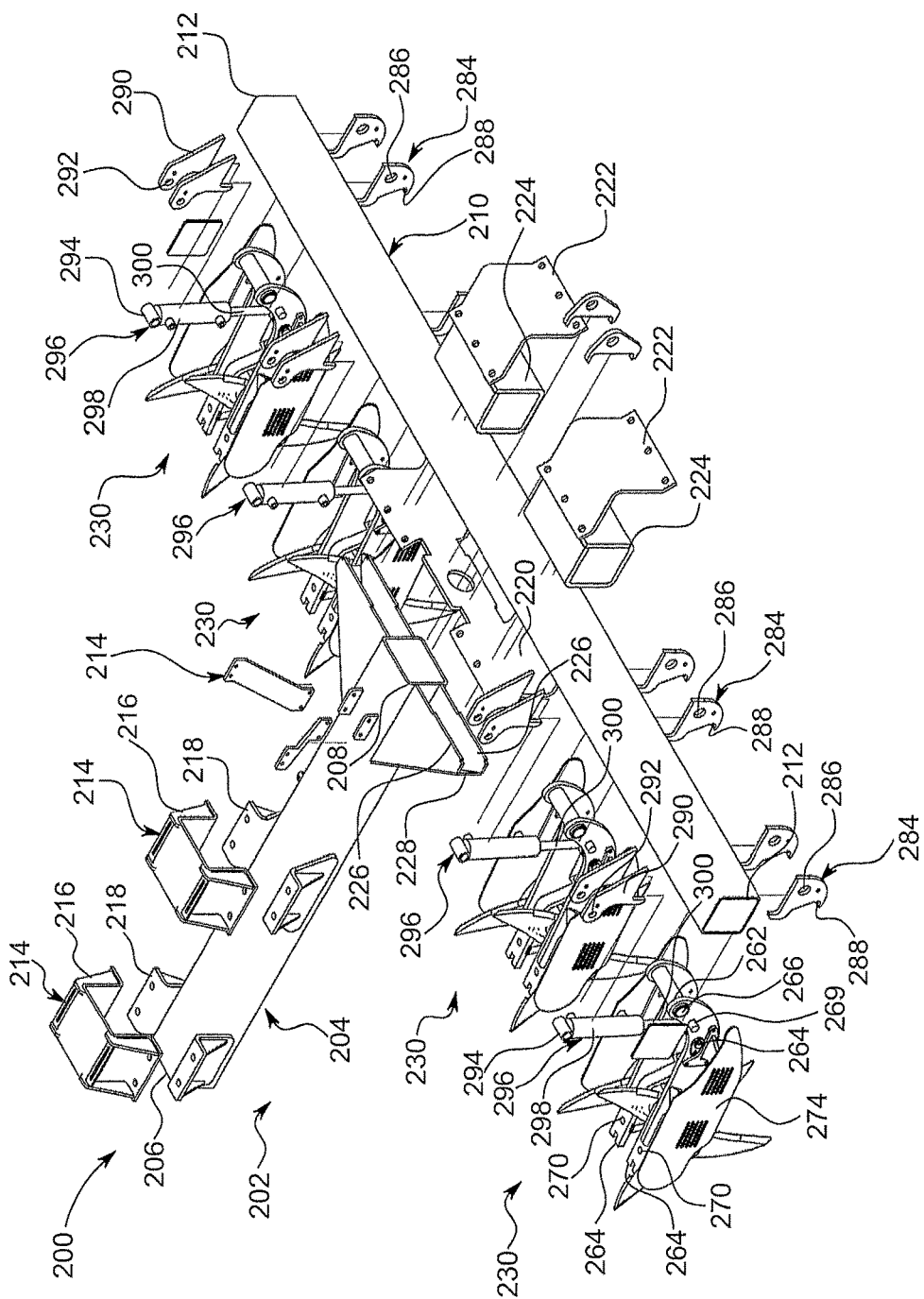
FIG. 30 is an exploded perspective view of the arrangement shown in FIGS. 23-29.

Agricultural Machinery & Agricultural Implement:

While the arrangement shown herein in FIGS. 21 and 22 shows tillage devices 28 connected to an agricultural implement 30 that is a planter that includes a plurality of wheels 32, the teachings herein is not so limited. It is hereby contemplated, that the systems presented herein can be used on any agricultural implement or any piece of agricultural machinery that is used in an agricultural field. In view of the teachings herein, it is within the skill of one of ordinary skill in the art to attach the tillage devices 28 behind any agricultural implement or agricultural machine of any configuration including planters, tractors, sprayers, cultivators, combines, harvesters, spreaders, wagons, trucks, or any other vehicle or implement or attachment to any of these devices. In view of the unlimited scope of application for the technology presented herein, for the purposes of brevity, and to avoid redundancy, only FIGS. 21 and 22 are presented showing attachment to an agricultural implement or agricultural machinery. As such, the terms agricultural implement or agricultural machinery are to be broadly construed to include any such application.

Control System & Down Pressure System:

In one arrangement, the system presented herein is controlled by a control system 302 (not shown). Control system 302 is any device or system that controls operation of the tillage devices 28. In one arrangement, control system 302 is a switch or plurality of switches positioned with the cab of tractor 34. In one arrangement, control system 302 is formed of a single switch that simultaneously controls engagement and disengagement of all tillage devices 28. In another arrangement, control system is formed of a switch for each tillage device 28, wherein each switch independently controls a tillage device 28. In either of these arrangements, the control system 302 is positioned within convenient reach of the user within the cab of tractor 34 such that the user can quickly and easily engage and disengage the tillage devices 28.

In another arrangement, control system 302 is connected to a control system of the tractor 34 or implement 30 such as a GPS system a computer system or any other control system for the tractor 34 or agricultural implement 30. In this arrangement, the control system for the tractor 34 or agricultural implement 30 automatically moves the tillage devices 28 between an engaged and disengaged position. As one example, as the control system for the tractor 34 or agricultural implement 30 detects that a field boundary has been crossed (such as crossing into end rows on a field) the control system for the tractor 34 or agricultural implement 30 simultaneously turns off the row units of the planter 30 while it raises the tillage devices 28.

Control system 302 also includes means for setting, selecting and adjusting the downward position as well as the down pressure applied to the tillage devices 28 by movement members 23, 80, 296 (which in one arrangement is shown as a hydraulic or pneumatic cylinder). Using control system 302 the user can control the optimal down pressure. As the down pressure increases, greater pressure is applied and the tillage devices 28 are less likely to rise when an obstacle is encountered. In contrast, as the down pressure decreases, less pressure is applied and the tillage devices 28 are more likely to rise when an obstacle is encountered. The optimal pressure setting is selected based on the particular application and the field and environmental conditions. In one arrangement, the control system of the tractor 34 or implement 30 controls the down pressure setting and monitors the position of the tillage devices 28 and how much movement (due to obstacles) occurs and adjusts the down pressure accordingly based on various parameters. In one arrangement, between 800 lbs. and 1,000 lbs. of down pressure has been tested with success.

Tracks:

As is described herein, tracks have been adopted for use in the agricultural industry to reduce compaction over using wheels alone. While tracks have been tested to provide some compaction reduction, tracks still create substantial compaction issues. As such, the teachings herein are contemplated for use with tracks as well, and nothing herein is to be interpreted as excluding use in association with tracks. Furthermore, track systems, either used on tractors, planters or any other agricultural implement or agricultural machine are comprised of one or more wheels and therefore the term wheels, as used herein, equally applies to track systems (which include wheels).

From the above discussion, it will be appreciated that a tillage device for agricultural machinery or implements that reduces compaction caused by wheels in a field has been presented that improves upon the state of the art. That is, provide a tillage device for agricultural machinery or implements that: is easy to use; can easily be installed on conventional and existing agricultural implements; does not substantially interfere with the use or operation of the agricultural machinery or implements is robust; is simple; does not greatly increase the amount of drag placed on the agricultural implement or greatly increase the amount of torque or horsepower required to operate the agricultural implement; has an intuitive design; is relatively inexpensive; improves plant yield and health; has a long useful life; has a short pay-back period; has a minimum number of parts; can be precisely controlled; is selectively positional between an operable position and an inoperable position; reduces or eliminates the effect of implement weight has on compaction; reduces compaction without requiring additional passes across the field; among countless other features and advantages.

It will be appreciated by those skilled in the art that other various modifications could be made to the device without parting from the spirit and scope of this invention. All such modifications and changes fall within the scope of the claims and are intended to be covered thereby.

What is claimed:

1. A system for tilling compression marks formed in soil of a field by agricultural machinery or equipment having a plurality of compaction forming members, the system comprising:
    a plurality of roller assemblies;
    each of the plurality of roller assemblies having a plurality of blade assemblies positioned in spaced relation to one another;
    each of the plurality of roller assemblies operatively connected to a frame member;
    a plurality of row units;
    wherein the plurality of row units are configured to plant seeds in the soil of the field;
    wherein each of the plurality of roller assemblies are positioned between a pair of adjacent row units configured to plant seeds in the soil of the field;
    wherein the plurality of roller assemblies are configured to rotate;
    a movement device connected to each of the plurality of roller assemblies wherein when activated the movement device moves the associated roller assembly between a disengaged position, where the roller assembly does not penetrate the soil, and an engaged position, where the roller assembly does penetrate and till the soil;
    each of the plurality of roller assemblies each having at least one guard positioned in spaced relation to the associated roller assembly;
    wherein each guard is configured to deflect dirt that is kicked up during the tilling process;
    wherein the plurality of roller assemblies are positioned behind and in alignment with a plurality of compaction forming members of the agricultural machinery or equipment;
    wherein when the agricultural machinery or equipment moves through the field the compaction forming members form compression marks in the soil of the field;
    wherein when in an engaged position, when the agricultural machinery or equipment moves through the field, the plurality of roller assemblies till the compression marks formed by the compaction forming members;
    wherein when in an engaged position, when the agricultural machinery or equipment moves through the field, the plurality of roller assemblies till the compression marks formed by the compaction forming members the at least one guard associated with each roller assembly deflects dirt that is kicked up during the tilling process;
    wherein positioning each of the plurality of roller assemblies behind and in alignment with a compaction forming member of the agricultural machinery or equipment facilitates tilling of the area behind and in alignment with the aligned compaction forming member while leaving the area between the compaction forming members untilled;
    wherein the at least one guard associated with each roller assembly is configured to prevent dirt kicked up during the tilling process from landing outside of the tilled area which is behind and in alignment with the aligned compaction forming member.

2. The system of claim 1, wherein the plurality of blade assemblies have a plurality of tines.

3. The system of claim 1, wherein the plurality of blade assemblies are formed of discs.

4. The system of claim 1, wherein the plurality of roller assemblies are positioned forward of or rearward of the frame member which is connected to or is part of the agricultural machinery or equipment.

5. The system of claim 1, wherein each guard includes a first guard member and a second guard member, wherein the first guard member is positioned on a first side of the plurality of roller assemblies and the second guard member is positioned on a second side of the plurality roller assemblies opposite the first side.

6. The system of claim 1, wherein the movement device connected to each of the plurality of roller assemblies is a hydraulic or pneumatic cylinder.

7. The system of claim 1, wherein the at least one guard is configured to direct dirt kicked up from the tilling process down in the area that is tilled.

8. The system of claim 1, wherein the agricultural machinery or equipment includes a planter.

9. The system of claim 1, wherein the compaction forming members are wheels.

10. A system for tilling compression marks formed in the soil of a field by agricultural machinery or equipment having a plurality of compaction forming members, the system comprising:
a plurality of row units;
wherein the plurality of row units are configured to plant seeds in the soil of the field;
a frame member;
a first roller assembly and a second roller assembly operably connected to the frame member;
wherein the first roller assembly is positioned between a pair of adjacent row units configured to plant seeds in the soil of the field;
a first guard positioned in spaced relation to the first roller assembly and configured to deflect dirt kicked up by the first roller assembly, and a second guard positioned in spaced relation to the second roller assembly and configured to deflect dirt kicked up by the second roller assembly;
wherein the first guard is operatively connected to the first roller assembly;
wherein the second guard is operatively connected to the second roller assembly;
a movement device operatively connected to each of the first roller assembly and the second roller assembly;
wherein each of the first roller assembly and second roller assembly are operatively connected to the movement device;
wherein the first roller assembly is positioned in alignment with and behind a first compaction forming member that creates a first compression mark in the soil in the field, and the second roller assembly is positioned in alignment with and behind a second compaction forming member that creates a second compression mark in the soil in the field;
wherein when activated the movement device operatively connected to the first roller assembly and the movement device operatively connected to the second roller assembly move the first roller assembly and the second roller assembly between a disengaged position and an engaged position;
wherein when the first roller assembly and the second roller assembly are in an engaged position, the first roller assembly tills a first compression mark formed in the soil of the field by the first compaction forming member, and the second roller assembly tills a second compression mark formed in the soil of the field by the second compaction forming member;
wherein when the first roller assembly and the second roller assembly are in an engaged position the first guard deflects dirt kicked up by the first roller assembly and is configured to prevent dirt kicked up during the tilling process from landing outside of the tilled area which is behind and in alignment with the first compaction forming member, and the second guard deflects dirt kicked up by the second roller assembly and is configured to prevent dirt kicked up during the tilling process from landing outside of the tilled area which is behind and in alignment with the second compaction forming member;
wherein the soil in the area between the first compression mark and the second compression mark remains untilled.

11. The system of claim 10, wherein the first roller assembly and the second roller assembly have a plurality of blade assemblies positioned in spaced relation to one another.

12. The system of claim 10, wherein the first roller assembly and the second roller assembly are positioned forward of or rearward of the frame member.

13. The system of claim 10, wherein the frame member includes a laterally extending frame member and a cross bar frame member that form a T-shaped member.

14. The system of claim 10, wherein the movement device of the first roller assembly and the movement device of the second roller assembly are a hydraulic or pneumatic cylinder that applies a down pressure force.

15. The system of claim 10, wherein the first guard and the second guard are configured to direct dirt kicked up from the tilling process down in the area that is tilled.

16. The system of claim 10, wherein the agricultural machinery or equipment includes a planter; wherein the second roller assembly is positioned between a second pair of adjacent row units configured to plant seeds in the soil of the field.

17. The system of claim 10, wherein the first compaction forming member is a wheel and the second compaction forming member is a wheel.

18. A method of tilling compression marks formed in soil of a field, the method comprising the steps of:
providing agricultural machinery or equipment having compaction forming members;
providing agricultural machinery or equipment having a plurality of row units wherein the plurality of row units are configured to plant seeds in the soil of the field;
providing a plurality of roller assemblies;
positioning each of the plurality of roller assemblies between a pair of adjacent row units configured to plant seeds in the soil of the field;
providing a plurality of guards;
positioning at least one of the plurality of guards in spaced relation to each of the plurality of roller assemblies such that the plurality of guards are configured to deflect dirt that is kicked up during the tilling process;
positioning each of the plurality of roller assemblies behind and in alignment with a compaction forming member of the agricultural machinery or equipment that forms a compression mark in the soil of the field and operably connecting each of the plurality of roller assemblies to the agricultural machinery or equipment in alignment with a compaction forming member of the agricultural machinery or equipment;
moving the agricultural machinery or equipment through the field;
forming compression marks in the field by the compaction forming members connected to the agricultural machinery or equipment;
moving the plurality of roller assemblies between a disengaged position, where the plurality of roller assemblies do not penetrate the soil, and an engaged position where the plurality of roller assemblies penetrate and till the soil;

tilling compression marks by the plurality of roller assemblies when the plurality or roller assemblies are in an engaged position while simultaneously leaving the soil between the plurality of roller assemblies untilled;

kicking up dirt by the plurality of roller assemblies during the tilling process;

deflecting dirt kicked up by the plurality of roller assemblies during the tilling process by the guard associated with each roller assembly such that the dirt kicked up during the tilling process is deflected in such a way that it is prevented from landing outside of the tilled area which is behind and in alignment with the aligned compaction forming member.

19. The method of claim 18, wherein the plurality of roller assemblies have a plurality of blade assemblies positioned in spaced relation to one another, and the blade assemblies have a plurality of tines.

20. The method of claim 18, further comprising the step of providing a movement device connected to each of the plurality of roller assemblies wherein each movement device is configured to move the associated roller assembly between the disengaged position and the engaged position, wherein the movement device is a hydraulic or pneumatic cylinder.

21. The method of claim 18, wherein the at least one guard is configured to direct dirt kicked up from the tilling process down in the area that is tilled.

22. The method of claim 18, wherein the agricultural machinery or equipment includes a planter.

23. The system of claim 18, wherein the compaction forming members are wheels.

24. A system for tilling compression marks formed in soil of a field by compaction forming members connected to agricultural machinery or equipment, the system comprising:

a plurality of row units;
wherein the plurality of row units are configured to plant seeds in the soil of the field;
a frame member;
a first roller assembly connected to the frame member;
wherein the first roller assembly is positioned between a pair of adjacent row units configured to plant seeds in the soil of the field;
the first roller assembly having at least one blade assembly;
a first movement device operatively connected to the first roller assembly and the frame member;
wherein when activated the first movement device moves the first roller assembly between a disengaged position, where the first roller assembly does not penetrate the soil, and an engaged position where the first roller assembly penetrates and tills the soil;
a first guard, the first guard positioned in spaced relation to the first roller assembly, wherein the first guard is configured to deflect dirt that is kicked up during the tilling process;
wherein the first guard is operatively connected to the first roller assembly;
a second roller assembly connected to the frame member;
the second roller assembly having at least one blade assembly;
a second movement device operatively connected to the second roller assembly and the frame member;
wherein when activated the second movement device moves the second roller assembly between a disengaged position, where the second roller assembly does not penetrate the soil, and an engaged position where the second roller assembly penetrates and tills the soil;
a second guard, the second guard positioned in spaced relation to the second roller assembly, wherein the second guard is configured to deflect dirt that is kicked up during the tilling process;
wherein the second guard is operatively connected to the second roller assembly;
wherein the first roller assembly is positioned rearward of and in alignment with a first compaction forming member of the agricultural machinery or equipment;
wherein the second roller assembly is positioned rearward of and in alignment with a second compaction forming member of the agricultural machinery or equipment;
wherein when the agricultural machinery is moved through the field, the first compaction forming member forms a compression mark in the soil of the field and the second compaction forming member forms a compression mark in the soil of the field;
wherein when the first roller assembly is in an engaged position, the first roller assembly tills the compression mark formed by the first compaction forming member and the first guard deflects dirt kicked up by the first roller assembly from landing outside of the tilled area which is behind and in alignment with the aligned first compaction forming member;
wherein when the second roller assembly is in an engaged position, the second roller assembly tills the compression mark formed by the second compaction forming member and the second guard deflects dirt kicked up by the second roller assembly from landing outside of the tilled area which is behind and in alignment with the aligned second compaction forming member;
wherein the soil between the compression marks formed by the first compaction forming member and the second compaction forming member remains untilled.

* * * * *